United States Patent
Hong et al.

(10) Patent No.: US 9,641,292 B2
(45) Date of Patent: May 2, 2017

(54) LOAD MODULATION-BASED BEAMSPACE MIMO TRANSMISSION METHOD AND APPARATUS

(71) Applicant: ELECTRONICS AND TELECOMMUNICATIONS RESEARCH INSTITUTE, Daejeon (KR)

(72) Inventors: Seung Eun Hong, Daejeon (KR); Il Gyu Kim, Chungcheongbuk-Do (KR); Seung Chan Bang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/925,539

(22) Filed: Oct. 28, 2015

(65) Prior Publication Data
US 2016/0142186 A1 May 19, 2016

(30) Foreign Application Priority Data

Oct. 29, 2014 (KR) .................. 10-2014-0147849
Oct. 22, 2015 (KR) .................. 10-2015-0147570

(51) Int. Cl.
| H04L 5/00 | (2006.01) |
| H04B 7/04 | (2006.01) |
| H04L 27/26 | (2006.01) |
| H04B 7/06 | (2006.01) |
| H04B 7/0413 | (2017.01) |

(52) U.S. Cl.
CPC ......... *H04L 5/0023* (2013.01); *H04B 7/0413* (2013.01); *H04B 7/0617* (2013.01); *H04L 27/2626* (2013.01)

(58) Field of Classification Search
CPC .. H04B 7/0413; H04B 7/0408; H04B 7/0697; H04B 7/0617; H04L 27/2626
See application file for complete search history.

(56) References Cited

U.S. PATENT DOCUMENTS

| 7,519,022 B2 | 4/2009 | Yu et al. |
| 2008/0225975 A1 | 9/2008 | Lee et al. |

(Continued)

OTHER PUBLICATIONS

Osama N. Alrabadi, Constantinos B. Papadias, Antonis Kalis, Nicola Marchetti and Ramjee Prasad, "MIMO Transmission and Reception Techniques Using Three-Element ESPAR Antennas", Athens Information technology, Athens, Greece, 2009, IEEE.*

(Continued)

*Primary Examiner* — Aristocratis Fotakis
(74) *Attorney, Agent, or Firm* — Rabin & Berdo, P.C.

(57) ABSTRACT

Disclosed are a load modulation-based beamspace MIMO transmission method and apparatus. The beamspace MIMO transmission apparatus may include a plurality of impedance loading circuits each including a plurality of imaginary impedance devices, a beamspace MIMO control unit calculating loading values of the plurality of imaginary impedance devices, corresponding to a spatial multiplexing orthogonal frequency division multiplexing (OFDM) sample, and an RF chain unit generating a first signal having a predetermined carrier frequency.

19 Claims, 10 Drawing Sheets

(56) References Cited

U.S. PATENT DOCUMENTS

| | | | | |
|---|---|---|---|---|
| 2014/0064403 | A1* | 3/2014 | Woodsum | H04L 27/2601 375/295 |
| 2015/0092621 | A1* | 4/2015 | Jalloul | H04L 5/143 370/278 |
| 2015/0124688 | A1* | 5/2015 | Xu | H04B 7/0452 370/312 |
| 2015/0244433 | A1* | 8/2015 | Jindal | H04B 7/0413 370/329 |
| 2015/0326285 | A1* | 11/2015 | Zirwas | H04B 7/0452 375/267 |

OTHER PUBLICATIONS

Mohammad A. Sedaghat, Ralf R. Muller and Georg Fischer, A Novel Single-RF Transmitter for Massive MIMO, Norwegian University of Science & Technology, Norway, and University of Erlangen-Nurnberg, Germany, Mar. 2014, IEEE.*

Vlasis I. Barousis, Constantinos B. Papadias and Ralk R.Muller, A new signal model for MIMO communication with compact parasitic arrays, Athens Information Technology (AIT), Greece, May 2014.*

Evangelos D. Thomatos, Panagiotis N. Vasileiou, Athanasios G. Kanatas, Genetic algorithm applied to beamspace-multiple-input and multiple-output single-radio frequency front-end reconfigurable transceivers, University of Piraeus, Greece, IEEE, Jan. 2014.*

Bo Han, Vlasis I. Barousis, Antonis Kalis, Constantinos B. Papadias, Athanasios G. Kanatas, and Ramjee Prasad, "A Single RF MIMO Loading Network for High-Order Modulation Schemes", Athens Information Technology (AIT)-Greece, Aalborg University-Denmark, SignalGeneriX-Cyprus and University of Piraeus-Greece, Jul. 2014.*

Vlasis I. Barousis, et al., "Beamspace-Domain Analysis of Single-RF Front-End MIMO Systems", IEEE Transactions on Vehicular Technology, vol. 60, No. 3, Mar. 2011.

* cited by examiner

LOAD MODULATION-BASED BEAMSPACE MIMO TRANSMISSION METHOD AND APPARATUS

CROSS-REFERENCE TO RELATED APPLICATION

This application claims priority to and the benefit of Korean Patent Application Nos. 10-2014-0147849 and 10-2015-0147570, filed in the Korean Intellectual Property Office on Oct. 29, 2015 and Oct. 22, 2015, respectively, the entire contents of which are incorporated herein by reference.

BACKGROUND OF THE INVENTION (a) Field of the Invention

The present invention relates to load modulation-based beamspace MIMO transmission method and apparatus.

(b) Description of the Related Art

Recently, with the progress of mobile smart devices and services, we are now moving into a hyper-connection society and the age of big data. As a result, mobile traffic doubling every year and is expected to be increased by 1000 times or more over the next 10 years. Due to the sudden increase in the mobile traffic, a burden of a mobile carrier is becoming more and more increased.

Generally, capacity of a wireless network is determined based on a spectrum bandwidth, frequency efficiency, and cell density. Recently, researches for using a millimeter wave to secure a new frequency band have been conducted, but the installation of a great number of small cells and the improvement in frequency efficiency are expected to be first realized. To facilitate the installation of small cells, a small base station is more urgently required. In frequency efficiency, there is a need to efficiently realize a multi-input multi-output (MIMO) technology. However, to realize the MIMO technology, a plurality of RF chains need to be installed in a base station and a terminal of as many as the number of antennas, and therefore it is difficult to implement the MIMO in economical costs and hardware. Further, a spatial constraint occurs due to the disposition of the plurality of antennas, and therefore the existing MIMO technology has a limitation in application to the small base station and the terminal.

SUMMARY OF THE INVENTION

The present invention has been made in an effort to provide a beamspace MIMO transmission method and apparatus having advantages of maximizing frequency efficiency and a compact antenna.

The present invention has also been made in an effort to provide a beamspace MIMO transmission method and apparatus capable of minimizing complexity of an RF chain.

An exemplary embodiment of the present invention provides a beamspace MIMO transmission apparatus. The beamspace multi-input multi-output (MIMO) transmission apparatus may include: a plurality of impedance loading circuits including a plurality of imaginary impedance devices each connected to a plurality of antenna elements; a beamspace MIMO control unit calculating loading values of the plurality of imaginary impedance devices, corresponding to a spatial multiplexing orthogonal frequency division multiplexing (OFDM) sample for beamspace multi-input multi-output (MIMO) and setting the calculated loading values in the plurality of impedance devices; and an RF chain unit generating a first signal having a predetermined carrier frequency and transmitting the generated first signal to the plurality of impedance loading circuits.

The plurality of impedance loading circuits may be each configured of only the plurality of imaginary impedance devices other than resistance components.

The first signal may have a sine wave having a fixed size and phase which are not fluctuated in the spatial multiplexing OFDM sample.

The beamspace MIMO control unit may include: a beamspace mapping unit calculating currents introduced into each of the plurality of antenna elements by considering information on the spatial multiplexing OFDM sample, information on basis beams orthogonal to each other, and information on geometry of the plurality of antenna elements; and a load modulator control unit using the calculated current to calculate the loading values of the plurality of imaginary impedance devices.

The beamspace mapping unit may include a delay unit delaying the spatial multiplexing OFDM sample by a predetermined time, and the predetermined time may be set by considering time for the beamspace mapping unit to calculate the current time for the load modulator control unit to calculate the loading values, and time for the plurality of impedance loading circuits to output the loading values.

The beamspace MIMO transmission apparatus may further include a plurality of switches each connected between the RF chain unit and the plurality of impedance loading circuits, in which the beamspace mapping unit may synchronize switching of the plurality of switches by considering the predetermined time.

The RF chain unit may include an impedance matching circuit, and the beamspace mapping unit may use the calculated loading value to set an impedance value of the impedance matching circuit.

The RF chain unit may include: an oscillator generating the first signal; and a power amplifier amplifying amplitude of the first signal.

The RF chain unit further may further include an attenuator attenuating the amplitude of the first signal, in which the beamspace mapping unit may normalize a magnitude of a beamspace signal vector to which the spatial multiplexing OFDM sample belongs and control the attenuator, corresponding to the normalized magnitude of the beamspace signal vector.

The beamspace mapping unit may calculate the current by further considering a channel state.

The plurality of imaginary impedance devices may have a pi-type structure or a T-type structure.

Another exemplary embodiment of the present invention provides a beamspace multi-input multi-output (MIMO) transmission method generating a beamspace signal by modulating loads connected to a plurality of antenna elements, respectively. The beamspace multi-input multi-output (MIMO) transmission method generating a beamspace signal by modulating loads each connected to a plurality of antenna elements may include: providing a plurality of imaginary impedance devices to the plurality of antenna elements, respectively; generating a spatial multiplexing OFDM sample for the beamspace multi-input multi-output (MIMO) by using a plurality of data streams; calculating loading values of the plurality of imaginary impedance devices, corresponding to the spatial multiplexing OFDM sample; setting the calculated loading values in the plurality of imaginary impedance devices; and generating a first signal having a predetermined carrier frequency and transmitting the generated first signal to the plurality of antenna elements and the plurality of imaginary impedance devices.

The load may be configured of only the plurality of imaginary impedance devices other than resistance components.

The generating may include: generating the spatial multiplexing signal by performing spatial precoding on the plurality of data streams; and generating the spatial multiplexing orthogonal frequency division multiplexing (OFDM) sample by performing inverse fast Fourier transform (IFFT) on the spatial multiplexing signal.

The first signal may have a sine wave having a fixed size and phase which are not fluctuated in the spatial multiplexing OFDM sample.

The beamspace multi-input multi-output (MIMO) transmission method may further include: delaying the spatial multiplexing OFDM sample by a predetermined time; and synchronizing the predetermined time with a transmission time of the first signal.

Yet another exemplary embodiment of the present invention provides a beamspace MIMO transmission apparatus. The beamspace MIMO transmission apparatus may include: a first load modulation unit including a plurality of imaginary impedance devices each connected to a plurality of antenna elements; a second load modulation unit including a plurality of imaginary impedance devices each connected to a plurality of antenna elements; a beamspace MIMO control unit calculating loading values of the plurality of imaginary impedance devices, corresponding to a spatial multiplexing orthogonal frequency division multiplexing (OFDM) sample for beamspace multi-input multi-output (MIMO) and setting the calculated loading values in the plurality of impedance devices; an oscillator generating a first signal having a predetermined carrier frequency; a first amplifier amplifying the first signal and transmitting the amplified first signal to the first load modulation unit; and a second amplifier amplifying the first signal and transmitting the amplified first signal to the second load modulation unit.

The first and second load modulation units may each be configured of only the plurality of imaginary impedance devices other than resistance components.

The first signal may have a sine wave having fixed a size and phase which are not fluctuated in the spatial multiplexing OFDM sample.

The beamspace MIMO control unit may include: a beamspace mapping unit calculating currents introduced into each of the plurality of antenna elements by considering information on the spatial multiplexing OFDM sample, information on basis beams orthogonal to each other, and information on geometry of the plurality of antenna elements; and a load modulator control unit using the calculated current to calculate the loading values of the plurality of imaginary impedance devices.

According to an exemplary embodiment of the present invention, it is possible to transmit the beamspace MIMO by configuring the antenna loading circuit of only the imaginary impedance devices.

According to another exemplary embodiment of the present invention, it is possible to simply configure the radio frequency (RF) chain unit by generating the load modulation-based beamspace MIMO signal.

According to still another exemplary embodiment of the present invention, it is possible to implement the massive MIMO by configuring the load modulation unit in the module form.

DETAILED DESCRIPTION OF THE EMBODIMENTS

Figure 1:
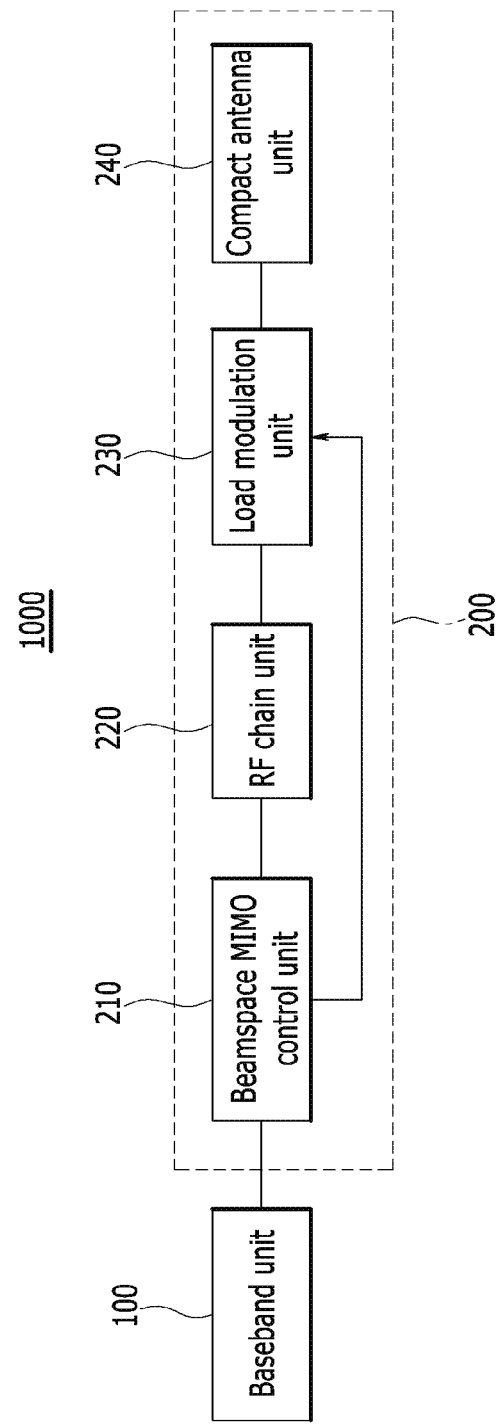
FIG. 1 is a diagram illustrating a downlink block diagram of a load modulation-based beamspace MIMO base station according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may be called a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like, and may include functions of all or some of the MT, the MS, the AMS, the HR-MS, the SS, the PSS, the AT, the UE, and the like.

Further, a base station (BS) may be called an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, and the like, and may also include functions of all or some of the ABS, the HR-BS, the nodeB, the eNodeB, the AP, the RAS, the BTS, the MMR-BS, the RS, the HR-RS, and the like.

Exemplary embodiments of the present invention may be supported by standard documents disclosed in at least one of an Institute of Electrical and Electronics Engineers (IEEE) 802 system, a 3GPP system, a 3GPP LTE system, and a 3GPP2 system, which are wireless access systems. That is, steps or parts which are not described to clearly expose the technical ideas of the present invention in the exemplary embodiments of the present invention may be supported by the above documents. Further, all the terms disclosed in the present document may be described by the standard document. Specific terms used in the following description are provided to help understandings of the present invention.

The use of the specific terms may be changed into other forms without departing from the technical idea of the present invention.

Hereinafter, a load modulation-based beamspace MIMO transmission method and apparatus according to an exemplary embodiment of the present invention will be described.

FIG. 1 is a diagram illustrating a downlink block diagram of a load modulation-based beamspace MIMO base station according to an exemplary embodiment of the present invention.

As illustrated in FIG. 1, a load modulation-based beamspace MIMO base station 1000 according to an exemplary embodiment of the present invention includes a baseband unit 100 and a beamspace MIMO transmission apparatus 200.

The baseband unit 100 generates spatial multiplexing signals by performing spatial precoding on a plurality of data streams and performs an inverse fast Fourier transform (IFFT) on the spatial multiplexing signals, respectively. That is, the baseband unit 100 performs an LTE baseband function.

The baseband unit 100 performs the IFFT to transform quadrature amplitude modulation (QAM) signals in a frequency domain into orthogonal frequency division multiplexing (OFDM) signals in a time domain. An input of the IFFT is an OFDM symbol expressed by a sum of the QAM signals generated for each subcarrier as the QAM signal in the frequency domain. Here, a length of an OFDM symbol section is an inverse number of an interval between the subcarriers and is 1/15 kHz=66.7 μs in the case of the LTE. An output of the IFFT is OFDM samples in the time domain generated by sampling one OFDM symbol at 30.72 MHz (15 kHz*2048=30.72 MHz). That is, the OFDM samples of 32.5 ns (1/30.72 MHz) are generated by the IFFT. One OFDM sample value has a complex value and therefore is divided into an I value and a Q value. Each of the I and Q values of the OFDM sample generally has a transition expressed by 12 to 14 bits. Hereinafter, the OFDM samples output from the baseband unit 100 are referred to as 'spatial multiplexing OFDM samples'.

As such, the spatial multiplexing OFDM samples from the baseband unit 100 are rapidly output at 32.5 ns, and therefore as described below, the beamspace MIMO transmission apparatus 200 according to the exemplary embodiment of the present invention requires time delay and synchronization operations.

As illustrated in FIG. 1, the beamspace MIMO transmission apparatus 200 includes a beamspace MIMO control unit 210, an RF chain unit 220, a load modulation unit 230, and a compact antenna unit 240. A detailed configuration and operation of the beamspace MIMO transmission apparatus 200 will be described below in detail with reference to FIG. 2.

Figure 2:
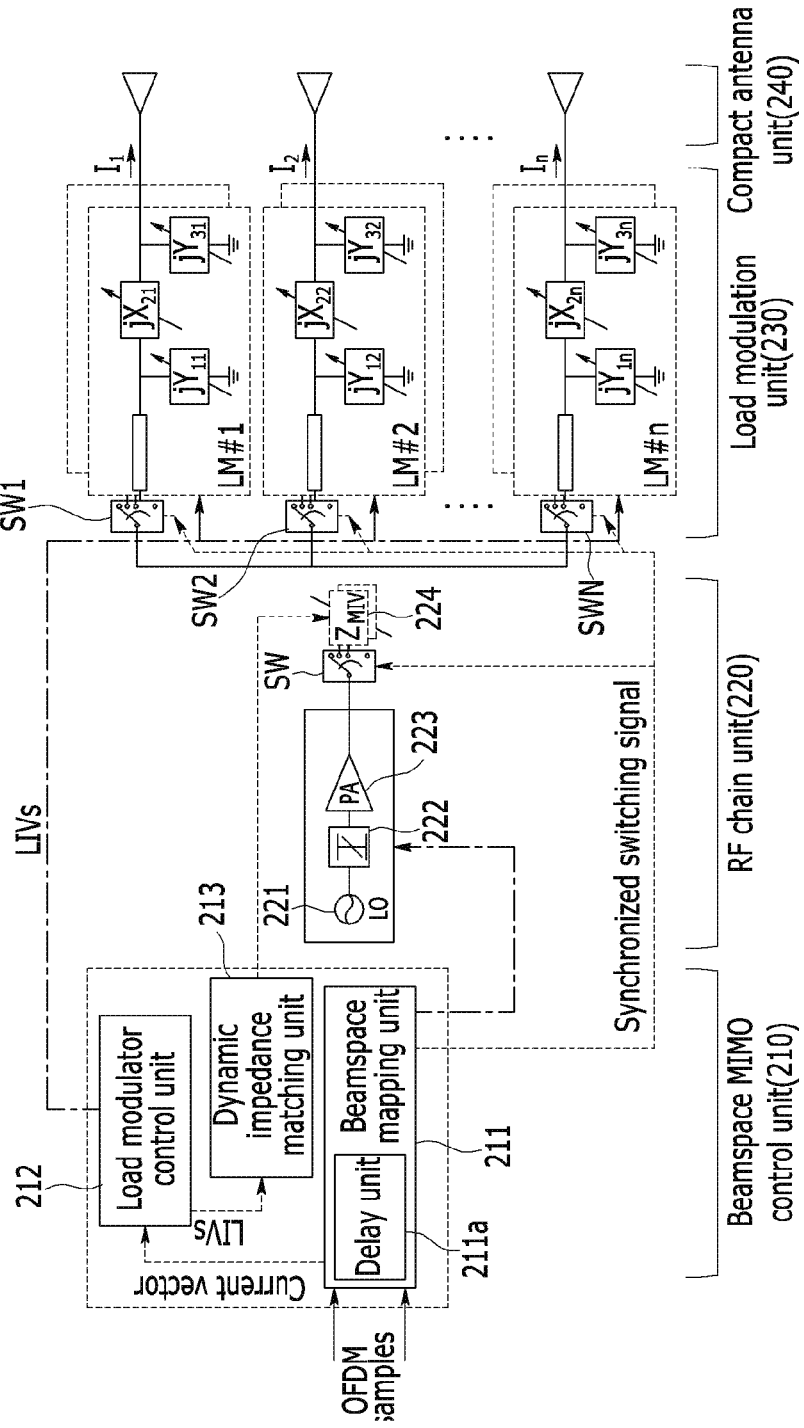
FIG. 2 is a diagram illustrating a beamspace MIMO transmission apparatus in detail according to an exemplary embodiment of the present invention.

FIG. 2 is a diagram illustrating the beamspace MIMO transmission apparatus 200 according to an exemplary embodiment of the present invention in detail.

As illustrated in FIG. 2, the beamspace MIMO control unit 210 according to the exemplary embodiment of the present invention includes a beamspace mapping unit 211, a load modulator control unit 212, and a dynamic impedance matching unit 213.

The beamspace mapping unit 211 receives the spatial multiplexing OFDM samples from the baseband unit 100 and maps the received OFDM samples onto the beamspace.

The beamspace mapping unit 211 sets a basis beam expressing the beamspace based on geometry of the used antenna. Further, the beamspace mapping unit 211 determines a final beam pattern radiated to a wireless space by linearly coupling the basis beams with signals to be spatially multiplexed. Here, an antenna steering vector is given, and therefore the final beam pattern is determined by a current introduced into antenna elements (i.e., antennas of the compact antenna unit 240). The current introduced into the antenna elements has a current vector form, and a current vector calculated by the beamspace mapping unit 211 is input to the load modulator control unit 212. Meanwhile, the beamspace mapping unit 211 may serve to adaptively readjust the number of basis beams and the basis beams depending on a channel state. A beamspace multiplexing mapping method by the beamspace mapping unit 211 will be described below in more detail.

Further, the beamspace mapping unit 211 serves to normalize an amplitude of a beamspace multiplexing signal. All devices configuring a loading circuit of the load modulation unit 230 are configured of only imaginary impedance, and therefore the load modulation unit 230 may not adjust the amplitude of the signal. Therefore, the beamspace mapping unit 211 adjusts power of the multiplexing signals to be transmitted based on maximum power of the multiplexing signals transmitted onto the beamspace. The method will be described below in more detail.

The beamspace mapping unit 211 delays the input spatial multiplexing OFDM samples and performs a synchronized switching operation. As described above, the spatial multiplexing OFDM samples are output from the baseband unit 100 at 32.5 ns and therefore an operation delaying the same is required. Therefore, the beamspace mapping unit 211 uses a delay unit 211a to perform a predetermined time delay on beamspace signal vectors which are combinations of the spatial multiplexing OFDM samples. The delay unit 211a may be implemented by a delay buffer. A depth Bd of the delay buffer is determined based on the number of OFDM samples which may be stored during a predetermined time delay. Meanwhile, the beamspace mapping unit 211 instructs the RF chain unit 220 and the load modulation unit 230 to be switched when the delay unit 211a outputs one OFDM sample. A switching synchronization method of the beamspace mapping unit 211 will be described below in more detail.

The load modulator control unit 212 receives current vectors introduced into each antenna element from the beamspace mapping unit 211 to calculate loaded impedance values (LIVs) for the beamspace MIMO operation. The loaded impedance values (LIVs) are associated with a configuration of an impedance loading circuit of the load modulation unit 230. A method for calculating loaded impedance values (LIVs) will be described below in detail. The load modulator control unit 212 outputs the calculated loaded impedance values to the load modulation unit 230 and the dynamic impedance matching unit 213.

The dynamic impedance matching unit 213 uses the loaded impedance values (LIVs) received from the load modulator control unit 212 to match impedances of all the antennas. The impedance of the antenna is generally set to be 50 Ω but may not be accurately set to be 50 Ω due to the load modulator control unit 212 and the load modulation unit 230. For this purpose, the dynamic impedance matching unit 213 sets an impedance matching value. The dynamic impedance matching unit 213 uses the set impedance matching value to control an impedance matching circuit 224 of the RF chain unit 220.

Beamspace Multiplexing Mapping

The beamspace mapping unit 211 performs the beamspace multiplexing mapping. Hereinafter, the beamspace multiplexing mapping method will be described. The beamspace multiplexing mapping corresponds to calculating currents introduced into each antenna device.

In a general MIMO transmission apparatus in which the RF chains are present for each antenna element, spatial multiplexing signal streams are transferred to the corresponding antenna elements via individual RF chains. However, in the case of the beamspace MIMO transmission apparatus 200, the spatial multiplexing signals adjust orthogonal beam patterns provided by antennas. Representing it by a mathematical model, it is as in the following Equation 1.

$$P_T(\theta, \varphi) = \sum_{n=0}^{M-1} s_{bs,n} \Phi_n(\theta, \varphi)$$
$$= \sum_{n=0}^{M-1} \sum_{m=0}^{M-1} i_m q_{mn} \Phi_n(\theta, \varphi)$$
$$= \sum_{m=0}^{M-1} i_m \sum_{n=0}^{M-1} q_{mn} \Phi_n(\theta, \varphi)$$
$$= \sum_{m=0}^{M-1} i_m a_m(\theta, \varphi)$$
(Equation 1)

In the above Equation 1, $P_T(\theta,\phi)$ represents a radiation pattern on the wireless space in three dimensions (3D), $a_m(\theta,\phi)$ represents a steering vector of an m-th antenna element in 3D, and $\Phi_n(\theta,\phi)$ represents an n-th basis beam pattern in 3D. $q_{mn}$ represents the steering vector of the m-th antenna element projected onto the n-th basis beam pattern, and $i_m$ represents a current introduced into the m-th antenna element. Further, $S_{bs,n}$ represents the spatial multiplexing signal mapped to the n-th basis beam.

When information on the spatial multiplexing OFDM samples, information on the basis beam, and information on the steering vector projection of the antenna element are defined, the current introduced into the antenna elements may be obtained based on first and second equations of the above Equation 1. That is, the currents introduced into the antenna elements may be represented by the following Equation 2.

$$s_{bs,n} = i^T q_n, q_n = [q_{0n} \ldots q_{(N-1)n}]^T$$ (Equation 2)

In the case of a uniform linear array antenna, a 2D representation of the steering vector is as in the following Equation 3.

$$a(\phi) = [1 e^{-jb \sin \phi} e^{-j2b \sin \phi} \ldots e^{-j(N-1)b \sin \phi}]^T$$ (Equation 3)

Further, in the case of a circular array antenna having an electronically steerable parasitic array radiator (ESPAR) form, a 2D representation of the steering vector is as in the following Equation 4.

$$a(\phi) = [1 e^{jb \cos(\phi-\phi_1)} e^{jb \cos(\phi-\phi_2)} \ldots e^{jb \cos(\phi-\phi_{N-1})}]^T$$ (Equation 4)

In the above Equations 3 and 4, $b=2\pi d$, d represents an interval between the antenna elements of which the wavelengths are normalized, and N is the number of antenna elements. Further, the $\phi_m$ is as in the following Equation 5.

$$\varphi_m = \frac{m-1}{N-1}(2\pi), m = 1, \ldots, N-1$$ (Equation 5)

There are various methods for deriving a basis beam from an antenna steering vector, and one example of the methods may include Gram-Schmidt orthogonal processing.

The Gram-Schmidt orthogonal processing will be described below. A first function $a_0(\phi)$ is selected from the steering vector and thus the first basis beam pattern is determined based on the following Equation 6.

$$\Phi_0(\phi) = a_0(\phi)/k_0$$ (Equation 6)

In the above Equation 6, $k_0 = \sqrt{\int_0^{2\pi} |a_0(\phi)|^2 d\phi}$.

The second basis beam pattern is calculated by calculating $q_{10}$ which is a projection onto $\Phi_0(\phi)$ of $a_1(\phi)$, subtracting $q_{10}\Phi_0(\phi)$ from $a_1(\phi)$, and dividing it by k1 to be normalized.

Generalizing the process, the basis beam pattern is as in the following Equation 7.

$$\Phi_n(\varphi) = \frac{1}{k_n}\left(a_n(\varphi) - \sum_{s=0}^{n-1} q_{ns}\Phi_s(\varphi)\right)$$ (Equation 7)

$$\forall n = 1, \ldots, M-1$$

$$k_n = \left(\int_0^{2\pi} \left|a_n(\varphi) - \sum_{s=0}^{n-1} q_{ns}\Phi_s(\varphi)\right|^2 d\varphi\right)^{1/2}$$

$$q_{ns} = \int_0^{2\pi} a_n(\varphi)\Phi_s^*(\varphi)d\varphi$$

In the following explanation, for convenience of explanation, the beamspace multiplexing mapping method will be described when the two antenna elements are configured, but may be extensively applied to N antenna elements. The steering vector for the two antenna elements is determined based on the following Equation 8.

$$a(\phi) = [1 e^{jb \cos(\phi)}]^T$$ (Equation 8)

By the steering vector of the above Equation 8 and the Gram-Schmidt orthogonal processing, the basis beam patterns for the two antenna elements are determined based on the following Equation 9.

$$\Phi_0(\varphi) = 1/k_0,$$ (Equation 9)

$$k_0 = \sqrt{2\pi}$$

$$q_{10} = \frac{1}{k_0}\int_0^{2\pi} e^{jb\cos\varphi}d\varphi = 2\pi I_0(jb)/k_0$$

$$\Phi_1(\varphi) = \frac{1}{k_1}(e^{jb\cos\varphi} - 2\pi I_0(jb)/k_0^2)$$

$$k_1 = \sqrt{\int_0^{2\pi} |e^{jb\cos\varphi} - 2\pi I_0(jb)/k_0^2|^2 d\varphi}$$

$$= \sqrt{\int_0^{2\pi}[\cos(b\cos\varphi) - 2\pi I_0(jb)/k_0^2]^2 d\varphi + \int_0^{2\pi}\sin^2(b\cos\varphi)d\varphi}$$

$$= \sqrt{2\pi + (\pi/k_0^2 - 1)8\pi^2 I_0^2(jb)/k_0^2}$$

By the above Equations 2 and 9, a relationship equation between the signal multiplexed onto the beamspace and the current is established based on the following Equation 10.

$$[s_{bs,0}\ s_{bs,1}] = [i_0\ i_1]$$ (Equation 10)

$$\begin{bmatrix} q_{00} & q_{01} \\ q_{10} & q_{11} \end{bmatrix} = [i_0\ i_1]\begin{bmatrix} k_0 & 0 \\ 2\pi I_0(jb)/k_0 & k_1 \end{bmatrix}$$

Calculation of Loaded Impedance Values

Next, the method for calculating, by the load modulator control unit 212, the loaded impedance values (LIVs) for the beamspace MIMO operation will be described.

As illustrated in FIG. 2, in the load modulation unit 230, the impedance loading circuits LM#1 to LM#n are configured of three imaginary impedance devices and transmission lines for each antenna. FIG. 2 illustrates only the case in which the imaginary impedance devices are connected to each other in a pi-type, but the imaginary impedance devices may be connected to each other in a T-type. Hereinafter, for convenience of explanation, when the impedance loading circuit is configured of the transmission lines and the imaginary impedance devices of the pi-type, a procedure and a method for calculating imaginary impedance device values will be described. For convenience of calculation, it is assumed that the number of antennas is two, but the number of antennas may be extended to n as described below.

Figure 3:
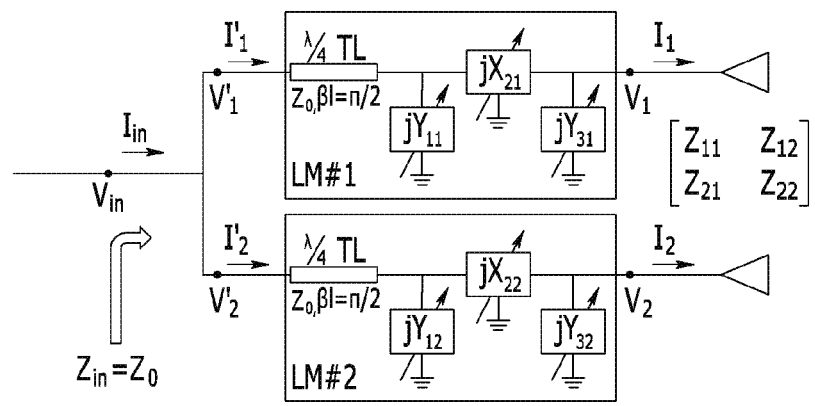
FIG. 3 is a diagram illustrating an antenna circuit analysis when the number of antennas is two.

FIG. 3 is a diagram illustrating an antenna circuit analysis when the number of antennas is two.

In the case of the antenna configuration as illustrated in FIG. 3, it may be represented as the following Equation 11 when being analyzed by a Z parameter.

$$\begin{bmatrix} V_1 \\ V_2 \end{bmatrix} = \begin{bmatrix} Z_{11} & Z_{12} \\ Z_{21} & Z_{22} \end{bmatrix}$$ (Equation 11)

$$\begin{bmatrix} I_1 \\ I_2 \end{bmatrix} = \begin{bmatrix} Z_0(z_{11,r} + jz_{11,i}) & Z_0(z_{12,r} + jz_{12,i}) \\ Z_0(z_{21,r} + jz_{21,i}) & Z_0(z_{22,r} + jz_{22,i}) \end{bmatrix}\begin{bmatrix} I_1 \\ I_2 \end{bmatrix}$$

$I_1$ and $I_2$ of the above Equation 11 each correspond to $i_0$ and $i_1$ of the above Equation 10.

There is a need to analyze the impedance loading circuits LM#1 and LM#2 for each antenna of the load modulation unit 230. Although other parameters Z, Y, or S may also be used, when circuit networks having at least two ports are connected in series, ABCD parameter matrixes of each circuit network are multiplied, thereby easily obtaining each ABCD parameter. Therefore, to facilitate the circuit analysis, the ABCD parameter will be described below.

A characteristics impedance value $Z_0$ of the transmission line is impedance when a length of a line is infinite. By the $Z_0$, the ABCD parameter of a transmission signal having a length l is as in the following Equation 12.

$$\begin{bmatrix} \cos\beta l & jZ_0\sin\beta l \\ j\frac{1}{Z_0}\sin\beta l & \cos\beta l \end{bmatrix}$$ (Equation 12)

In the above Equation 12, $\beta$ is a wave number and is a $2\pi/\lambda$ value. Therefore, in the case of a quarter-wavelength transmission line (that is, $l=\lambda/4$), the ABCD parameter is as in the following Equation 13.

$$\begin{bmatrix} 0 & jZ_0 \\ j\frac{1}{Z_0} & 0 \end{bmatrix}$$ (Equation 13)

The ABCD parameter for the impedance loading circuit LM#1 may be determined based on the following Equation 14.

$$\begin{bmatrix} V_1' \\ I_1' \end{bmatrix} = \begin{bmatrix} A_1 & B_1 \\ C_1 & D_1 \end{bmatrix}\begin{bmatrix} V_1 \\ V_1 \end{bmatrix}$$ (Equation 14)

$$= \begin{bmatrix} 0 & jZ_0 \\ j\frac{1}{Z_0} & 0 \end{bmatrix}\begin{bmatrix} 1 & 1 \\ jY_{11} & 0 \end{bmatrix}\begin{bmatrix} 1 & jX_{21} \\ 0 & 1 \end{bmatrix}\begin{bmatrix} 1 & 0 \\ jY_{31} & 1 \end{bmatrix}\begin{bmatrix} V_1 \\ I_1 \end{bmatrix}$$

$$= \begin{bmatrix} -y_{11}-y_{31}(1-x_{21}y_{11}) & jZ_0(1-x_{21}y_{11}) \\ j\frac{1}{Z_0}(1-x_{21}y_{31}) & -x_{21} \end{bmatrix}\begin{bmatrix} V_1 \\ I_1 \end{bmatrix}$$

$$= \begin{bmatrix} a_1 & jZ_0 b_1 \\ j\frac{1}{Z_0}c_1 & d_1 \end{bmatrix}\begin{bmatrix} V_1 \\ I_1 \end{bmatrix}$$

In the above Equation 14, $y_{11}$, $x_{21}$, $y_{31}$ and $a_1$, $b_1$, $c_1$, $d_1$ are defined as in the following Equation 15.

$$y_{11}=Z_0Y_{11}, x_{21}=X_{21}/Z_0, y_{31}=Z_0Y_{31}$$

$$a_1=-y_{11}-y_{31}(1-x_{21}y_{11}), b_1=(1-x_{21}y_{11}), c_1=(1-x_{21}y_{31}),$$
$$d_1=x_{21}$$ (Equation 15)

For the impedance loading circuit LM#1, the following Equation 16 may be obtained from the above Equation 14.

$$V_1' = a_1 V_1 + jZ_0 b_1 I_1$$ (Equation 16)

$$I_1' = j\frac{1}{Z_0}c_1 V_1 + d_1 I_1$$

Further, $a_1$, $b_1$, $c_1$, $d_1$ have a relationship as in the following Equation 17.

$$d_1 = \frac{1-b_1 c_1}{a_1}$$ (Equation 17)

By the same scheme, the impedance loading circuit LM#2 may be obtained by the following Equation 18.

$$V_2' = a_2 V_2 + jZ_0 b_2 I_2$$ (Equation 18)

$$I_2' = j\frac{1}{Z_0}c_2 V_2 + d_2 I_2$$

Further, $a_2$, $b_2$, $c_2$, and $d_2$ have a relationship as in the following Equation 19.

$$d_2 = \frac{1-b_2 c_2}{a_2}$$ (Equation 19)

Upon the application of a Kirchhoff voltage/current law at an input stage of FIG. 3, it is as in the following Equation 20.

$$V_{in} = V_1' = a_1 V_1 + jZ_0 b_1 I_1 \quad \text{(Equation 20)}$$

$$V_{in} = V_2' = a_2 V_2 + jZ_0 b_2 I_2$$

$$I_{in} = I_1' + I_2' = j\frac{1}{Z_0}c_1 V_1 + j\frac{1}{Z_0}c_2 V_2 + d_1 I_1 + d_2 I_2$$

Therefore, an input impedance $Z_{in}$ may be arranged as in the following Equation 21 based on the above Equation 20.

$$Z_{in} = \frac{V_{in}}{I_{in}} = \frac{a_1 V_1 + jZ_0 b_1 I_1}{j\frac{1}{Z_0}c_1 V_1 + j\frac{1}{Z_0}c_2 V_2 + d_1 I_1 + d_2 I_2} \quad \text{(Equation 21)}$$

The above Equations 20 and 21 may be arranged in $I_1$ as in the following Equation 22 based on a relationship equation $\eta = I_2/I_1 = \eta_r + j\eta_i$ and the above Equation 11.

$$V_{in} = V'_1 = Z_0[\delta_{1-}a_1 + j(\delta_{1+}a_1 + b_1)]I_1$$

$$V_{in} = V'_2 = Z_0[(\delta_{2-}a_2 - \eta_i b_2) + j(\delta_{2+}a_2 + \eta_r b_2)]I_1$$

$$I_{in} = [(d_1 + \eta_r d_2 - \delta_{1+}c_1 - \delta_{2+}c_2) + j(\eta_i d_2 + \delta_{1-}c_1 + \delta_{2-}c_2)]I_1 \quad \text{(Equation 22)}$$

In the above Equation 22, $\delta_{1-}, \delta_{1+}, \delta_{2-}, \delta_{2+}$ are defined as in the following Equation 23.

$$\delta_{1-} = z_{11,r} + \eta_r z_{12,r} - \eta_i z_{12,i}, \delta_{1+} = z_{11,i} + \eta_r z_{12,i} + \eta_i z_{12,r}$$

$$\delta_{2-} = z_{21,r} + \eta_r z_{22,r} - \eta_i z_{22,i}, \delta_{2+} = z_{21,i} + \eta_r z_{22,i} + \eta_i z_{22,r} \quad \text{(Equation 23)}$$

$V_{in} = V'_1 = V'_2$ such that a relationship as in the following Equation 23a may be derived from the above Equation 22.

$$\delta_{1-}a_1 - \delta_{2-}a_2 = -\eta_i b_2$$

$$\delta_{1+}a_1 - \delta_{2+}a_2 = \eta_r b_2 - b_1 \quad \text{[Equation 23a]}$$

Further, using a relationship equation of $\Delta_{12} = \delta_{1+}\delta_{2-} - \delta_{1-}\delta_{2+}$, $\Omega_{21} = \eta_r \delta_{1-} + \eta_i \delta_{1+}$, $\Omega_{22} = \eta_r \delta_{2-} + \eta_i \delta_{2+}$, a relationship Equation 24 as follows may be derived.

$$a_2 = \frac{\Omega_{21} b_2 - \delta_{1-} b_1}{\Delta_{12}}, \quad \text{(Equation 24)}$$

$$a_1 = \frac{\Omega_{22} b_2 - \delta_{2-} b_1}{\Delta_{12}}$$

For matching the input impedance, the input impedance of the above Equation 21 needs to satisfy the following Equation 25.

$$Z_{in} = \frac{V_{in}}{I_{in}} = \frac{Z_0[\delta_{1-}a_1 + j(\delta_{1+}a_1 + b_1)]I_1}{[(d_1 + \eta_r d_2 - \delta_{1+}c_1 - \delta_{2+}c_2) + j(\eta_i d_2 + \delta_{1-}c_1 + \delta_{2-}c_2)]I_1} = Z_0 \quad \text{(Equation 25)}$$

The following Equation 26 is established from the above Equation 25.

$$\delta_{1-}a_1 + j(\delta_{1+}a_1 + b_1) = \quad \text{(Equation 26)}$$

$$(d_1 + \eta_r d_2 - \delta_{1+}c_1 - \delta_{2+}c_2) + j(\eta_i d_2 + \delta_{1-}c_1 + \delta_{2-}c_2) \Rightarrow$$

$$\begin{cases} \delta_{1-}a_1 = d_1 + \eta_r d_2 - \delta_{1+}c_1 - \delta_{2+}c_2 \\ \delta_{1+}a_1 + b_1 = \eta_i d_2 + \delta_{1-}c_1 + \delta_{2-}c_2 \end{cases}$$

After the Equations 17 and 19 are substituted into the above Equation 26, when it is arranged by $c_1$ and $c_2$, the following Equation 27 is satisfied.

$$\left(\delta_{1+} + \frac{b_1}{a_1}\right)c_1 + \left(\delta_{2+} + \eta_r \frac{b_2}{a_2}\right)c_2 = \frac{1}{a_1} + \eta_r \frac{1}{a_2} - \delta_{1-}a_1 \quad \text{(Equation 27)}$$

$$\delta_{1-}c_1 + \left(\delta_{2-} - \eta_i \frac{b_2}{a_2}\right)c_2 = \delta_{1+}a_1 + b_1 - \eta_i \frac{1}{a_2}$$

Simultaneous equations of $c_1$ and $c_2$ expressed by the above Equation 27 are the same and therefore it needs to satisfy the following Equation 28.

$$\frac{\delta_{1+} + \frac{b_1}{a_1}}{\delta_{1-}} = \frac{\delta_{2+} + \eta_r \frac{b_2}{a_2}}{\delta_{2-} - \eta_i \frac{b_2}{a_2}} = \frac{\frac{1}{a_1} + \eta_r \frac{1}{a_2} - \delta_{1-}a_1}{\delta_{1+}a_1 + b_1 - \eta_i \frac{1}{a_2}} \quad \text{(Equation 28)}$$

By using the fact that a first term and a third term are the same in the above Equation 28, the following Equation 29 may be derived.

$$\delta_{1-}\left(\frac{1}{a_1} + \eta_r \frac{1}{a_2} - \delta_{1-}a_1\right) = \left(\delta_{1+} + \frac{b_1}{a_1}\right)\left(\delta_{1+}a_1 + b_1 - \eta_i \frac{1}{a_2}\right) \quad \text{(Equation 29)}$$

By the above Equation 24, when $a_1$ and $a_2$ are replaced in the above Equation 29, a quadratic equation as in the following Equation 30 may be derived.

$$(\delta_{1+}^2 + \delta_{1-}^2)\Omega_{22}^2 b_2^2 - 2\delta_{1-}(\delta_{1+}\delta_{2+} + \delta_{1-}\delta_{2-})\Omega_{22} b_1 b_2 +$$
$$\delta_{1-}^2(\delta_{2+}^2 + \delta_{2-}^2)b_1^2 - \Delta_{2-}^2 b_1^2 - \Delta_{12}^2(\delta_{1-} + \Omega_{22}) = 0 \quad \text{(Equation 30)}$$

A solution of the above Equation 30 is a solution of the quadratic equation and is defined as the following Equation 31 as a function of $b_1$.

$$b_2 = b_1 \frac{\delta_{1-}(\delta_{1+}\delta_{2+} + \delta_{1-}\delta_{2-})}{(\delta_{1+}^2 + \delta_{1-}^2)\Omega_{22}} \quad \text{(Equation 31)}$$

$$\left(1 \pm \sqrt{1 + \frac{(\delta_{1+}^2 + \delta_{1-}^2)}{(\delta_{1+}\delta_{2+} + \delta_{1-}\delta_{2-})^2}\left[\frac{\Delta_{12}^2(\delta_{1-} + \Omega_{22})}{\delta_{1-}^2 b_1^2} - (\delta_{2+}^2 + \delta_{2-}^2)\right]}\right) =$$

$$b_1 \frac{\delta_{1-}(\delta_{1-}\delta_{2-} + \delta_{1+}\delta_{2+})}{(\delta_{1+}^2 + \delta_{1-}^2)\Omega_{22}}$$

$$\left(1 \pm \left|\frac{\Delta_{12}}{\delta_{1+}\delta_{2+} + \delta_{1-}\delta_{2-}}\right|\sqrt{\frac{(\delta_{1+}^2 + \delta_{1-}^2)}{\delta_{1-}^2 b_1^2}(\delta_{1-} + \Omega_{22}) - 1}\right)$$

When a $b_1$ value is set as any value in the above Equation 31, $b_2$ is determined and $a_1$ and $a_2$ are determined based on the above Equation 24.

Meanwhile, it may be represented by the following Equation 32 using $c_1$ as a function of $c_2$ from a second equation of the above Equation 27.

$$c_1 = \frac{\delta_{1+}a_1 + b_1 - \eta_i \frac{1}{a_2} - \left(\delta_{2-} - \eta_i \frac{b_2}{a_2}\right)c_2}{\delta_{1-}} \quad \text{(Equation 32)}$$

In the above Equation 32, when $c_2$ is set as any one value, $c_1$ may be determined and $d_1$ and $d_2$ may be obtained by the above Equations 17 and 19.

Therefore, load values may be determined based on the following Equation 33 from the above Equation 15.

$$x_{21} = -d_1, \; y_{11} = \frac{b_1 - 1}{d_1}, \quad \text{(Equation 33)}$$
$$y_{31} = -\frac{b_1 - 1}{b_1 d_1} - \frac{a_1}{b_1} = \frac{c_1 - 1}{d_1}$$
$$x_{22} = -d_2, \; y_{12} = \frac{b_2 - 1}{d_2},$$
$$y_{32} = -\frac{b_2 - 1}{b_2 d_2} - \frac{a_2}{b_2} = \frac{c_2 - 1}{d_2}$$

Here, a matter to be considered is a phase component of current. The current phase may be represented as the following Equation 34 from the above Equation 22.

$$\angle \frac{I_1}{I_{in}} = \tan^{-1}\left(\frac{-\eta_i d_2 - \delta_{1-}c_1 - \delta_{2-}c_2}{d_1 + \eta_r d_2 - \delta_{1+}c_1 - \delta_{2+}c_2}\right) \quad \text{(Equation 34)}$$
$$= \angle \frac{Z_0 I_1}{V_{in}} = \angle \frac{I_1}{V_{in}} = \tan^{-1}\left(\frac{-\delta_{1+} a_1 - b_1}{\delta_{1-} a_1}\right)$$
$$= \theta$$

The phase component of the current needs to be fixed so that it is not changed depending on the varying load values. That is, in the above Equation 34, $\theta$ needs to be fixed. Therefore, the following Equation 35 is established.

$$\tan^{-1}\left(\frac{-\delta_{1+} a_1 - b_1}{\delta_{1-} a_1}\right) = \theta \Leftrightarrow -b_1 = a_1(\delta_{1+} + \delta_{1-}\tan\theta) \quad \text{(Equation 35)}$$

In the above Equation 35, when $a_1$ is replaced by the above Equation 24, it becomes the following Equation 35a.

$$\Omega_{22}(\delta_{1+} + \delta_{1-}\tan\theta)b_2 = \delta_{1-}(\delta_{2+} + \delta_{2-}\tan\theta)b_1 \quad \text{[Equation 35a]}$$

Arranging the above Equation 35a together with the above Equation 31, the following Equation 36 which is a $b_1$ equation may be derived.

$$b_1^2 = \frac{(\delta_{1+} + \delta_{1-}\tan\theta)^2(\delta_{1-} + \Omega_{22})}{\delta_{1-}^2(1 + \tan^2\theta)} \Rightarrow b_1 = \quad \text{(Equation 36)}$$
$$\pm \frac{\delta_{1+} + \delta_{1-}\tan\theta}{\delta_{1-}\sqrt{1 + \tan^2\theta}}\sqrt{\delta_{1-} + \Omega_{22}}$$

Therefore, parameters $b_2$, $a_2$, and $a_1$ may be determined based on the following Equation 37.

$$b_2 = \pm \frac{\delta_{2+} + \delta_{2-}\tan\theta}{\Omega_{22}\sqrt{1 - \tan^2\theta}}\sqrt{\delta_{1-} + \Omega_{22}} \quad \text{(Equation 37)}$$
$$a_2 = \mp \frac{\eta_r - \eta_i\tan\theta}{\Omega_{22}\sqrt{1 + \tan^2\theta}}\sqrt{\delta_{1-} + \Omega_{22}}$$
$$a_1 = \mp \frac{1}{\delta_{1-}\sqrt{1 + \tan^2\theta}}\sqrt{\delta_{1-} + \Omega_{22}}$$

When the above Equations 36 and 37 are substituted into the above Equation 32, the following Equation 38 may be derived.

$$\delta_{1-}c_1 + \frac{\Omega_{22}}{\eta_r - \eta_i\tan\theta}c_2 \mp \eta_i \frac{\Omega_{22}}{\eta_r - \eta_i\tan\theta}\frac{\sqrt{1 + \tan^2\theta}}{\sqrt{\delta_{1-} + \Omega_{22}}} = \quad \text{(Equation 38)}$$
$$\pm \tan\theta \frac{\sqrt{\delta_{1-} + \Omega_{22}}}{\sqrt{1 + \tan^2\theta}} \Leftrightarrow$$
$$\delta_{1-}\left(c_1 \mp \frac{\tan\theta}{\sqrt{1 + \tan^2\theta}\sqrt{\delta_{1-} + \Omega_{22}}}\right) +$$
$$\frac{\Omega_{22}}{\eta_r - \eta_i\tan\theta}\left(c_2 \mp \frac{\eta_i + \eta_r\tan\theta}{\sqrt{1 + \tan^2\theta}\sqrt{\delta_{1-} + \Omega_{22}}}\right) = 0$$

Meanwhile, the above Equation 38 satisfies the following Equation 39 for any $s$.

$$\frac{\Omega_{22}}{\eta_r - \eta_i\tan\theta}\left(c_2 \mp \frac{\eta_i + \eta_r\tan\theta}{\sqrt{1 + \tan^2\theta}\sqrt{\delta_{1-} + \Omega_{22}}}\right) = s \quad \text{(Equation 39)}$$
$$\delta_{1-}\left(c_1 \mp \frac{\tan\theta}{\sqrt{1 + \tan^2\theta}\sqrt{\delta_{1-} + \Omega_{22}}}\right) = -s$$

Therefore, $c_1$ and $c_2$ values to be obtained may be calculated based on the following Equation 40 for any $s$.

$$c_1 = -\frac{1}{\delta_{1-}}s \pm \frac{\tan\theta}{\sqrt{1 + \tan^2\theta}\sqrt{\delta_{1-} + \Omega_{22}}} \quad \text{(Equation 40)}$$
$$c_2 = \frac{\eta_r - \eta_i\tan\theta}{\Omega_{22}}s \pm \frac{\eta_i + \eta_r\tan\theta}{\sqrt{1 + \tan^2}\sqrt{\delta_{1-} + \Omega_{22}}}$$

Meanwhile, $\theta$ may be fixed to any value, but as described above, the load impedance values are determined based on a $\theta$ value and therefore the $\theta$ may be derived so that the transitions of the calculated load impedance values are reduced.

When a phase fixing value is $\theta = 0 \pm \pi$, by the above Equations 36, 37, and 40, parameters $a_1$, $b_1$, $c_1$, $a_2$, $b_2$, and $c_2$ may be obtained based on the following Equation 41.

$$b_1 = \pm \frac{\delta_{1+}}{\delta_{1-}}\sqrt{\delta_{1-} + \Omega_{22}}, \; b_2 = \pm \frac{\delta_{2+}}{\Omega_{22}}\sqrt{\delta_{1-} + \Omega_{22}}, \quad \text{(Equation 41)}$$
$$a_2 = \mp \frac{\eta_r}{\Omega_{22}}\sqrt{\delta_{1-} + \Omega_{22}}, \; a_1 = \mp \frac{1}{\delta_{1-}}\sqrt{\delta_{1-} + \Omega_{22}}$$
$$c_1 = -\frac{1}{\delta_{1-}}s, \; c_2 = \frac{\eta_r}{\Omega_{22}}s \pm \frac{\eta_i}{\sqrt{\delta_{1-} + \Omega_{22}}}$$

When parameters $a_1$, $b_1$, $c_1$, $a_2$, $b_2$, and $c_2$ calculated as in the above Equation 41 are applied to the Equations 17 and 19, parameters $d_1$ and $d_2$ may also be obtained. When all the calculated parameters $a_1$, $b_1$, $c_1$, $d_1$ $a_2$, $b_2$, $c_2$, and $d_2$ are applied to the above Equation 15, the load impedance value may be finally obtained.

As described above, in the case of the load impedance calculation in which the phase fixing is not considered, design parameters become $b_1$ and $c_2$. The two design parameter values may be set so that for all the sets of the signal pairs to be transmitted by the beamspace MIMO, antenna efficiency (for example, antenna reflection coefficients depending on the load impedance calculation values, or the like) is good and the transitions of the load impedance calculation values are small. In this case, the phase of current introduced into the antennas is changed, and therefore the transformation for fixing the phase of current flowing from the beamspace MIMO control unit 210 to the RF chain unit 220 is required.

Further, in the load impedance calculation considering the phase, as the design parameter, the phase fixing values θ and s (used to determine the $c_1$ and $c_2$ values) are present. The two design parameter values may be set so that for all the sets of the signal pairs to be performed by the beamspace MIMO, antenna efficiency (for example, antenna reflection coefficients depending on the load impedance calculation values, or the like) is good and the transitions of the load impedance calculation values are small.

As such, according to the exemplary embodiment of the present invention, the beamspace MIMO transmission may be implemented by only the imaginary impedance device (reactance device). The existing methods require a negative impedance device upon the transmission of the QAM signal or take much time to calculate the current introduced into each antenna device. The negative impedance device may be implemented by an active device (for example, a power amplifier), which causes an oscillation problem. On the contrary, according to the exemplary embodiment of the present invention, the beamspace MIMO transmission may be implemented by only the imaginary impedance device as described above.

Switching Synchronization Method

The spatial multiplexing OFDM sample output from the baseband unit 100 is 32.5 ns, and therefore the beam pattern radiated into the wireless space through the antenna also needs to be changed into a unit of 32.5 ns. As described above, the beamspace mapping unit 211 calculates the current values introduced into the antenna element depending on the beamspace signal vector value (spatial multiplexing OFDM sample), and the load modulator control unit 212 calculates the loaded impedance values to generate the calculated current value. Therefore, a time of 32.4 ns needs to include a current vector calculation time $T_1$ by the beamspace mapping unit 211, an impedance calculation time $T_2$ by the load modulator control unit 212, and time $T_3$ taken to stably output the loaded impedance values calculated by the load modulation unit 230.

To relieve a latency constraint of 32.5 ns, the delay unit 211a and a plurality of switches SW1 to SWN may be used. As illustrated in FIG. 2, the plurality of switches SW1 to SWN are each located at a front stage of the plurality of impedance loading circuits LM#1 to LM#N, and are controlled by the synchronized switching signal of the beamspace mapping unit 211.

By using a unit time $T_A$ that is smaller than 32.5 ns, T1, T2, and T3 may be set as in the following Equation 42.

$$T_1+T_2+T_3 = \alpha \cdot T_A + \beta \cdot T_A + \gamma \cdot T_A = (\alpha+\beta+\gamma)T_A \quad \text{(Equation 42)}$$

When a $(\alpha+\beta+\gamma)T_A$ value is larger than 32 ns, the delay unit 211a is required. When the delay unit 211a is implemented as a delay buffer, a size value of the delay buffer may be as in the following Equation 43.

$$B_d = \left\lceil \frac{(\alpha+\beta+\gamma)T_A}{32.5 \text{ ns}} \right\rceil \quad \text{(Equation 43)}$$

The delay buffer outputs the OFDM sample after the OFDM sample is delayed by $(\alpha+\beta+\gamma)T_A$ from the time when the OFDM sample is input. Further, when time $T_{out}$ from the output of the delay buffer to the radiation into the wireless space through the antenna satisfies a $T_{out} < (\alpha+\beta+\gamma)T_A$ condition, the beamspace mapping unit 211 sets the synchronized switching signal so that the plurality of switches SW1 to SWN are switched at the time when the OFDM sample is output from the delay buffer. By the above operation, the beamspace signal vector may be correctly transmitted to the wireless space.

Meanwhile, even when the dynamic impedance matching unit 213 is present, by the above-mentioned method, the dynamic impedance matching circuit 224 performs the synchronized switching operation by the switch SW. That is, as illustrated in FIG. 2, the switch SW included in the RF chain unit 220 is controlled by the synchronized switching signal of the beamspace mapping unit 211.

Normalization of Amplitude of Beamspace Multiplexing Signal

The beamspace signal vector is the spatial multiplexing OFDM samples. The size of the beamspace signal vector to which the corresponding OFDM sample belongs needs to be adjusted to have the size normalized by the beamspace signal vector having a maximum size in the entire signal vector space. That is, when $|s_{bs,i}|$ a size of the i-th OFDM sample configuring the beamspace signal vector and $|s_{bs,i}|_{max}$ the maximum value among an i-th beamspace multiplexing stream sample values, the normalization of the amplitude of the beamspace multiplexing signal is calculated based on the following Equation 44.

$$\eta_{bs} = \frac{\sum_{i=1}^{N} |s_{bs,i}|^2}{\sum_{i=1}^{N} |s_{bs,i}|^2_{max}} \quad \text{(Equation 44)}$$

A method for normalizing the amplitude of the beamspace multiplexing signal may be normalized at the analog stage. As illustrated in FIG. 2, after a PA 223 is maximally set, an attenuator 222 may attenuate a signal by the calculated normalization value $\eta_{bs}$. That is, the beamspace mapping unit 211 calculates the normalization value $\eta_{bs}$ as in the above Equation 44 to control the attenuator 222.

As another method for normalizing the amplitude of the beamspace multiplexing signal, there is a normalization method at a digital stage, and the normalization method adjusts the OFDM sample to the normalized sample value when the beamspace mapping unit 211 outputs the OFDM sample and outputs the adjusted OFDM sample.

Next, the RF chain unit 220 of FIG. 2 will be described.

As illustrated in FIG. 2, the RF chain unit 220 according to the exemplary embodiment of the present invention is configured of a single RF chain. Further, the RF chain unit 220 is configured of only some of the devices configuring the general RF chain.

A general RF chain includes a digital-to-analog converter (DAC) device for converting a digital signal into an analog signal, a power amplifier (PA) device, a local oscillator generating a specific carrier frequency signal, and a mixer mixing the carrier frequency with the output signal of the DAC device.

However, as illustrated in FIG. 2, the RF chain unit 220 according to the exemplary embodiment of the present invention includes an oscillator 221, an attenuator 222, and a power amplifier 223. That is, a load modulation-based beamspace MIMO transmission method according to an exemplary embodiment of the present invention need not directly mix the transmission signal at the RF stage and therefore the DAC device and the mixer are not required. The oscillator 221 has a predetermined carrier frequency and generates a sine wave having a fixed size and phase. The attenuator 222 and the power amplifier 223 control the power of the transmission signal. The attenuator 222 is used to normalize the amplitude of the beamspace multiplexing signal as described above.

Meanwhile, the RF chain unit 220 according to the exemplary embodiment of the present invention may further include a dynamic impedance matching circuit 224. The impedance loading circuits of the load modulation unit 230 may be implemented as larger error than predetermined impedance value (for example, 50Ω) To compensate for the impedance mismatch, the dynamic impedance matching circuit 224 is required. The dynamic impedance matching circuit 224 may be implemented as a circuit which may generate variable impedance. A time constraint may be solved by installing a plurality of dynamic impedance matching circuits and by synchronized switching with each other.

Figure 4:
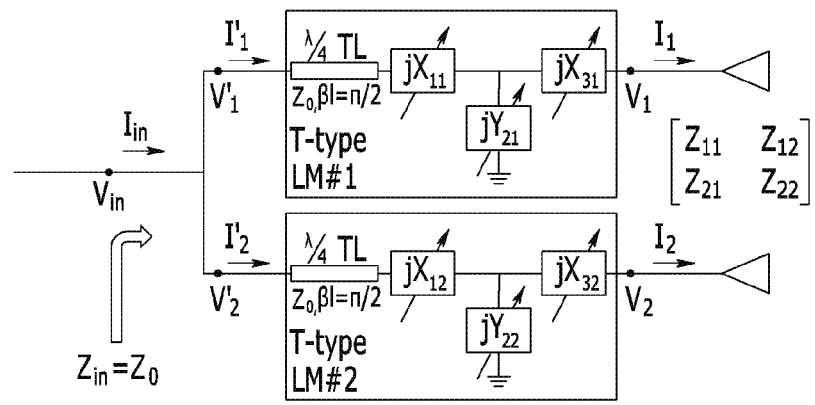
FIG. 4 is a diagram illustrating a case in which imaginary impedance devices have a T-type structure.

As illustrated in FIGS. 2 and 3, the load modulation unit 230 according to the exemplary embodiment of the present invention includes the plurality of impedance loading circuits LM#1 to LM#N. Each of the impedance loading circuits LM#1 to LM#N includes three imaginary impedance devices and the transmission lines. Meanwhile, as illustrated in FIGS. 2 and 3, the imaginary impedance devices may have a pi ($\pi$)-type structure, and as illustrated in FIG. 4, the imaginary impedance device may have a T-type structure. FIG. 4 is a diagram illustrating a case in which the imaginary impedance devices have the T-type structure. That is, FIG. 4 is the same as FIG. 3 except that the imaginary impedance devices have the T-type structure.

Figure 5:
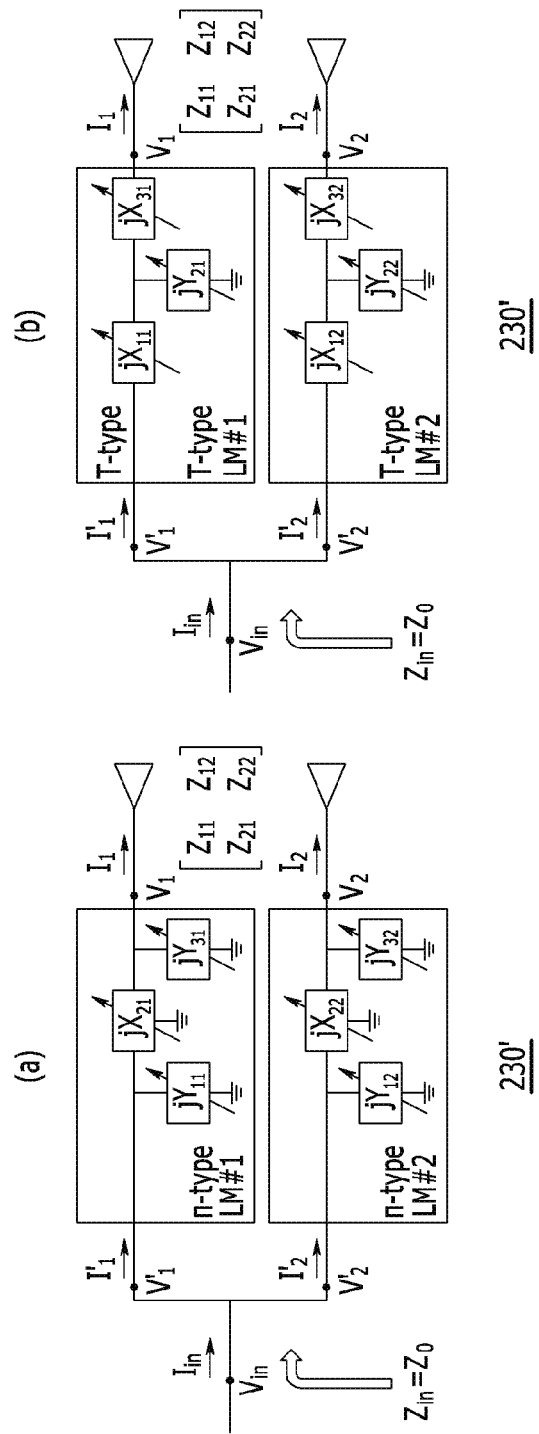
FIG. 5 is a diagram illustrating a load modulation unit according to another exemplary embodiment of the present invention.

FIGS. 5 (a) and (b) are diagrams illustrating a load modulation unit 230' according to another exemplary embodiment of the present invention. FIG. 5 (a) illustrates the case in which each impedance loading circuit of the load modulation unit 230' has the pi-type without the transmission line, and FIG. 5 (b) illustrates the case in which each impedance loading circuit of the load modulation unit 230' has the T-type structure without the transmission line. That is, FIG. 5 illustrates the case in which the transmission line is omitted in FIGS. 2 to 4.

The impedance loading circuits of FIGS. 3 to 5 are expressed by the ABCD parameter as in the following Equation 45 for the specific single antenna.

$$\begin{bmatrix} V_1' \\ I_1' \end{bmatrix} = \begin{bmatrix} a_1 & jZ_0 b_1 \\ j\frac{1}{Z_0} c_1 & d_1 \end{bmatrix} \begin{bmatrix} V_1 \\ I_1 \end{bmatrix} \quad \text{(Equation 45)}$$

In the above Equation 45, $a_1$, $b_1$, $c_1$, and $d_1$ may be generalized by $a_i$, $b_i$, $c_i$, and $d_i$. $a_i$, $b_i$, $c_i$, and $d_i$ may be defined for each circuit type as illustrated in the following Table 1, and follows a relational equation as in the following Equation 46.

$$d_i = \frac{1 - b_i c_i}{a_i} \quad \text{(Equation 46)}$$

The following Table 1 represents the ABCD parameter values for each type of the impedance loading circuits.

TABLE 1

| ABCD | pi-type Presence of transmission line | pi-type No transmission line | T-type Presence of transmission line | T-type No transmission line |
|---|---|---|---|---|
| $a_i$ | $-y_{3i} - y_{1i}(1 - x_{2i}y_{3i})$ | $1 - x_{2i}y_{3i}$ | $-y_{2i}$ | $1 - x_{1i}y_{2i}$ |
| $b_i$ | $1 - x_{2i}y_{1i}$ | $x_{2i}$ | $1 - x_{3i}y_{2i}$ | $x_{3i} + x_{1i}(1 - x_{3i}y_{2i})$ |
| $c_i$ | $1 - x_{2i}y_{3i}$ | $y_{3i} + y_{1i}(1 - x_{2i}y_{3i})$ | $1 - x_{1i}y_{2i}$ | $y_{2i}$ |
| $d_i$ | $-x_{2i}$ | $1 - x_{2i}y_{1i}$ | $-x_{3i} - x_{1i}(1 - x_{3i}y_{2i})$ | $1 - x_{3i}y_{2i}$ |

Pi-type: $y_{1i} = Z_0 Y_{1i}$, $y_{3i} = Z_0 Y_{3i}$, $x_{2i} = X_{2i}/Z_0$,
T-type: $y_{2i} = Z_0 Y_{2i}$, $x_{1i} = X_{1i}/Z_0$, $x_{3i} = X_{3i}/Z_0$ The method for calculating loaded the impedance value when the impedance loading circuit has the transmission line and the pi-type structure is described above, but in another case (in the case in which there is no transmission line or in the case of the T-type), the loaded impedance values may be calculated by the same method using the ABCD parameters defined in the above Table 1.

Next, the compact antenna unit 240 according to the exemplary embodiment of the present invention will be described.

As illustrated in FIG. 2, the number of antenna elements configuring the compact antenna unit 240 is equal to the number of spatial multiplexing streams. For example, when transmitting four spatial multiplexing streams, the compact antenna unit 240 has at least four antenna elements.

A spaced distance d between the antenna elements configuring the compact antenna unit 240 may be set to be smaller than a half-wavelength distance. The reason is that the basis beam patterns are derived from the antenna steering vector reflecting antenna geometry for the beamspace MIMO transmission.

Figure 6A:
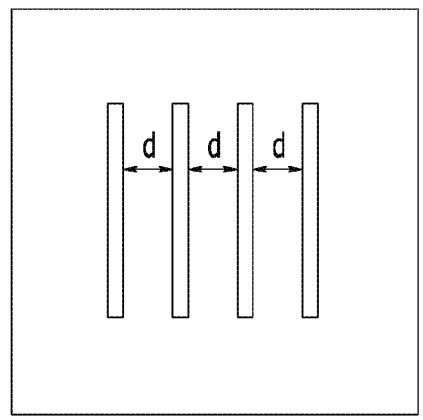
FIGS. 6A to 6C are diagrams each illustrating various dispositions of antenna elements.
Figure 6B:
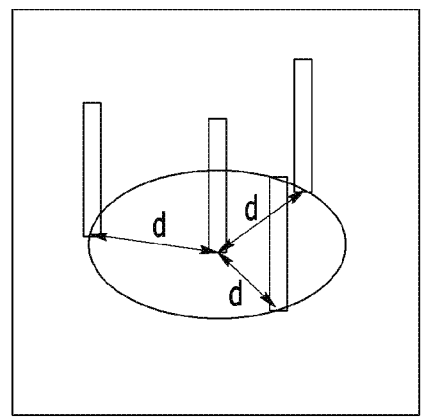
Figure 6C:
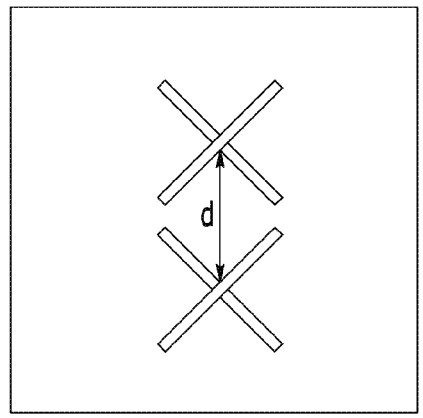

The antenna elements configuring the compact antenna unit 240 may have various dispositions. FIGS. 6A to 6C are diagrams illustrating various dispositions of the antenna elements. For convenience of explanation, FIGS. 6A to 6C illustrate four antenna elements.

As illustrated in FIG. 6A, the antenna elements configuring the compact antenna unit 240 may be configured in parallel. As illustrated in FIG. 6B, the antenna elements configuring the compact antenna unit 240 may be disposed in a circle based on one element. Meanwhile, FIGS. 6A and 6B illustrate that an antenna having a single polarity is disposed, but as illustrated in FIG. 6C, a disposition of an antenna using polarization characteristics may be possible. The spaced distance d between the antennas is illustrated in FIGS. 6A to 6C, and may be a smaller value than a half-wavelength spaced distance.

In the method for calculating loaded impedance values, it is assumed that the number of antennas is two, but the number of antennas may be extended to N. When the number of antennas is N, a design of the load modulation unit 230 will be described below.

Figure 7:
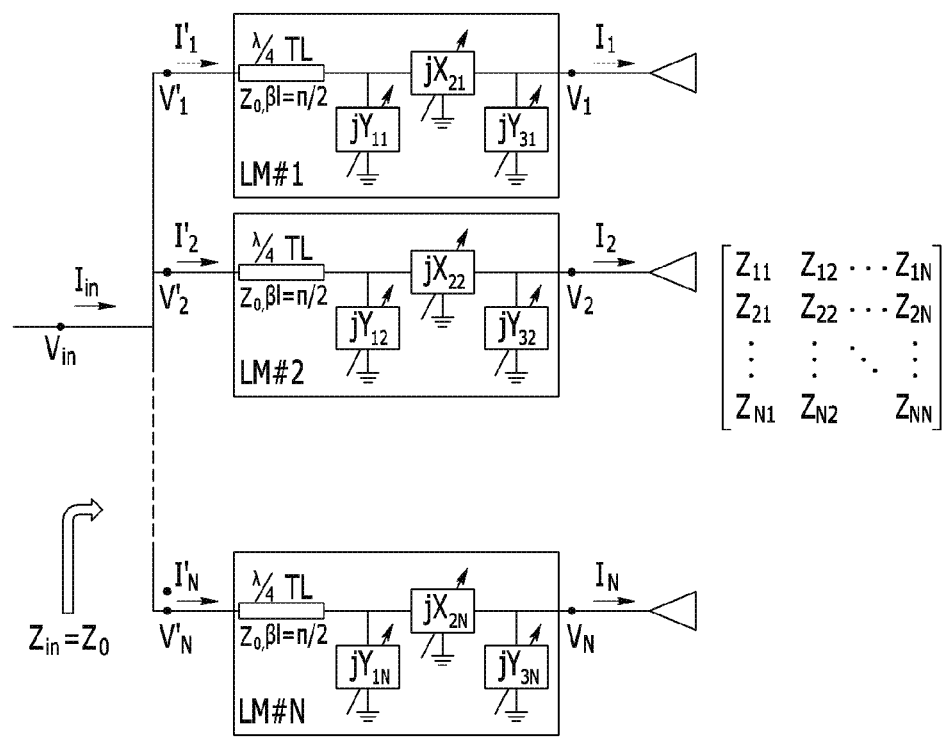
FIG. 7 is a diagram illustrating an antenna circuit analysis when the number of antennas is N.

FIG. 7 is a diagram illustrating an antenna circuit analysis when the number of antennas is N.

When the above Equations 20 and 21 used to analyze two antennas are applied to FIG. 7, the following Equations 47 and 48 may be derived.

$$V_{in} = a_n V_n + jZ_0 b_n I_n = \quad \text{(Equation 47)}$$
$$Z_0[(\delta_{n-} + j\delta_{n+})a_n + j(\eta_{n,r} + j\eta_{n,i})b_n]I_1,$$
$$n \in \{1, \ldots, N\}$$

$$I_{in} = \sum_{k=1}^{N} I'_k = \sum_{k=1}^{N} \left( j\frac{1}{Z_0} c_k V'_k + d_k I_k \right) =$$
$$I_1 \sum_{k=1}^{N} [j(\delta_{k-} + j\delta_{k+})c_k + (\eta_{k,r} + j\eta_{k,i})d_k]$$

$$Z_{in} = \frac{V_{in}}{I_{in}} = \frac{Z_0 I_1[(\delta_{1-} + j\delta_{1+})a_1 + jb_1]}{I_1 \sum_{k=1}^{N} [j(\delta_{k-} + j\delta_{k+})c_k + (\eta_{k,r} + j\eta_{k,i})d_k]} \quad \text{(Equation 48)}$$
$$= Z_0 \frac{(\delta_{1-} + j\delta_{1+})a_1 + jb_1}{\sum_{k=1}^{N} [(\eta_{k,r} d_k - \delta_{k+} c_k) + j(\delta_{k-} c_k + \eta_{k,i} d_k)]}$$
$$= Z_0$$

Here, a relationship equation between parameters as in the following Equation 49 is established.

$$\eta_k = \frac{I_k}{I_1} = \eta_{k,r} + j\eta_{k,i} \quad \text{(Equation 49)}$$
$$\delta_{n-} = \sum_{k=1}^{N} (\eta_{k,r} z_{nk,r} - \eta_{k,i} z_{nk,i})$$
$$\delta_{n+} = \sum_{k=1}^{N} (\eta_{k,r} z_{nk,i} + \eta_{k,i} z_{nk,r})$$
$$\Delta_{1n} = \delta_{1+}\delta_{n-} - \delta_{1-}\delta_{n+}$$
$$\Omega_{n1} = \eta_{n,r}\delta_{1-} + \eta_{n,i}\delta_{1+}$$
$$\Omega_{nn} = \eta_{n,r}\delta_{n-} + \eta_{n,i}\delta_{n+}$$

When the input voltage of the impedance loading circuit LM#1 and the input voltage of the impedance loading circuit LM#N are equal in the relational equation of an input voltage $V_{in}$ of the above Equation 47, the following Equation 50 may be induced.

$$a_1 = \frac{\Omega_{nn} b_n - \delta_{n-} b_1}{\Delta_{1n}}, \quad a_n = \frac{\Omega_{n1} b_n - \delta_{1-} b_1}{\Delta_{1n}} \quad \text{(Equation 50)}$$

Further, for all the impedance loading circuits LM#1 to LM#N, the following Equation 51 is established.

$$a_1 = \frac{\Omega_{nn} b_n - \delta_{n-} b_1}{\Delta_{1n}} = \quad \text{(Equation 51)}$$
$$\ldots = \frac{\Omega_{kk} b_k - \delta_{k-} b_1}{\Delta_{1k}} = \ldots = \frac{\Omega_{22} b_2 - \delta_{2-} b_1}{\Delta_{12}}$$

In the above Equation 53, $b_n$ for any impedance loading circuit LM#n expressed by a relationship equation of $b_1$ and $b_2$, the following Equation 52 is established.

$$b_n = \frac{\Omega_{22}\Delta_{1n} b_2 + (\delta_{n-}\Delta_{12} - \delta_{2-}\Delta_{1n})b_1}{\Omega_{nn}\Delta_{12}}, \quad \text{(Equation 52)}$$
$$n = 3, \ldots, N$$

Further, when $a_n$ is also expressed by the relationship equation of $b_1$ and $b_2$, $a_n$ may be expressed by the following Equation 53.

$$a_n = \frac{\Omega_{n1}\Omega_{22} b_2 - \delta_{1-}(\eta_{n,r}\delta_{2-} + \eta_{n,i}\delta_{2+})b_1}{\Omega_{nn}\Delta_{12}}, \quad \text{(Equation 53)}$$
$$n = 2, \ldots, N$$

By $\Omega_{11} = \delta_{1-}$, $\Delta_{11} = 0$, and the above Equation 51, the above Equations 52 and 53 may establish the following Equations 54 and 55 for all of n=1, ..., N.

$$b_n = \frac{\Omega_{22}\Delta_{1n} b_2 + (\delta_{n-}\Delta_{12} - \delta_{2-}\Delta_{1n})b_1}{\Omega_{nn}\Delta_{12}}, \quad \text{(Equation 54)}$$
$$n = 1, \ldots, N$$

$$a_n = \frac{\Omega_{n1}\Omega_{22} b_2 - \delta_{1-}(\eta_{n,r}\delta_{2-} + \eta_{n,i}\delta_{2+})b_1}{\Omega_{nn}\Delta_{12}}, \quad \text{(Equation 55)}$$
$$n = 1, \ldots, N$$

Meanwhile, from the input matching expressed by the above Equation 48, the following Equation 56 is established.

$$\delta_{1-} a_1 = \sum_{k=1}^{N} (\eta_{k,r} d_k - \delta_{k+} c_k) \quad \text{(Equation 56)}$$
$$\delta_{1+} a_1 + b_1 = \sum_{k=1}^{N} (\delta_{k-} c_k + \eta_{k,i} d_k)$$

When $d_k$ of the above Equation 46 is substituted in the above Equation 56, the following Equation 57 is derived.

$$\sum_{k=1}^{N} \left( \delta_{k+} + \eta_{k,r} \frac{b_k}{a_k} \right) c_k = \sum_{k=1}^{N} \frac{\eta_{k,r}}{a_k} - \delta_{1-} a_1 \quad \text{(Equation 57)}$$
$$\delta_{1+} a_1 + b_1 = \sum_{k=1}^{N} \left( \eta_{k,i} \frac{1}{a_k} \right) + \sum_{k=1}^{N} \left( \delta_{k-} - \eta_{k,i} \frac{b_k}{a_k} \right) c_k$$

Considering $\eta = 1$ (i.e., $\eta_{1,r} = 1$, $\eta_{1,i} = 0$) and the condition that a solution as the above Equation 28 is present, the above Equation 57 may be derived based on the following Equation 58.

$$\delta_{1-}\left( \sum_{k=1}^{N} \frac{\eta_{k,r}}{a_k} - \delta_{1-} a_1 \right) = \left( \delta_{1+} + \frac{b_1}{a_1} \right)\left( \delta_{1+} a_1 + b_1 - \sum_{k=1}^{N} \frac{\eta_{k,i}}{a_k} \right) \quad \text{(Equation 58)}$$

Arranging $b_2$ by substituting the above Equation 55 into the above Equation 58, the following Equation 59 may be derived.

$$(\delta_{1+}^2 + \delta_{1-}^2)\Omega_{22}^2 b_2^2 - 2\delta_{1-}(\delta_{1-}\delta_{2-} + \delta_{1+}\delta_{2+})\Omega_{22} b_1 b_2 + \quad \text{(Equation 59)}$$
$$\delta_{1-}^2(\delta_{2+}^2 + \delta_{2-}^2)b_1^2 - \Delta_{12}^2 \sum_{k=1}^{N} \Omega_{kk} = 0$$

The induction process of the above Equation 59 is the same as that of the following Equation 60. Arranging $$a_1 = \frac{\Omega_{22}b_2 - \delta_{2-}b_1}{\Delta_{12}}, \quad a_k = \frac{\Omega_{k1}\Omega_{22}b_2 - \delta_{1-}(\eta_{k,r}\delta_{2-} + \eta_{k,i}\delta_{2+})b_1}{\Omega_{kk}\Delta_{12}}$$

corresponding to the above Equation 58, it may be derived based on the following Equation 60.

$$(\delta_{1+}^2 + \delta_{1-}^2)\frac{\Omega_{22}b_2 - \delta_{2-}b_1}{\Delta_{12}} + 2\delta_{1+}b_1 + \frac{\Delta_{12}b_1}{\Omega_{22}b_2 - \delta_{2-}b_1}b_1 - \qquad \text{(Equation 60)}$$

$$\sum_{k=1}^{N} \frac{(\eta_{k,r}\delta_{1-} + \eta_{k,i}\delta_{1+})\Omega_{kk}\Delta_{12}}{\Omega_{k1}\Omega_{22}b_2 - \delta_{1-}(\eta_{k,r}\delta_{2-} + \eta_{k,i}\delta_{2+})b_1} -$$

$$\frac{\Delta_{12}b_1}{\Omega_{22}b_2 - \delta_{2-}b_1}$$

$$\sum_{k=1}^{N} \frac{\eta_{k,i}\Omega_{kk}\Delta_{12}}{\Omega_{k1}\Omega_{22}b_2 - \delta_{1-}(\eta_{k,r}\delta_{2-} + \eta_{k,i}\delta_{2+})b_1} =$$

$$0 \Rightarrow (\delta_{1+}^2 + \delta_{1-}^2)\frac{\Omega_{22}b_2 - \delta_{2-}b_1}{\Delta_{12}} + 2\delta_{1+}b_1 + \frac{\Delta_{12}b_1}{\Omega_{22}b_2 - \delta_{2-}b_1}$$

$$b_1 - \sum_{k=1}^{N} \frac{\Omega_{kk}\Delta_{12}}{\Omega_{k1}\Omega_{22}b_2 - \delta_{1-}(\eta_{k,r}\delta_{2-} + \eta_{k,i}\delta_{2+})b_1}$$

$$\left[\frac{\Omega_{k1}\Omega_{22}b_2 - \delta_1(\eta_{k,r}\delta_2 + \eta_{k,i}\delta_{21})b_1}{\Omega_{22}b_2 - \delta_{2-}b_1}\right] =$$

$$0 \Rightarrow (\delta_{1+}^2 + \delta_{1-}^2)\frac{\Omega_{22}b_2 - \delta_{2-}b_1}{\Delta_{12}} + 2\delta_{1+}b_1 +$$

$$\frac{\Delta_{12}b_1}{\Omega_{22}b_2 - \delta_{2-}b_1}b_1 - \sum_{k=1}^{N} \frac{\Omega_{kk}\Delta_{12}}{\Omega_{22}b_2 - \delta_{2-}b_1} =$$

$$0 \Rightarrow (\delta_{1+}^2 + \delta_{1-}^2)\Omega_{22}^2 b_2^2 -$$

$$2\delta_{1-}(\delta_{1-}\delta_{2-} + \delta_{1-}\delta_{2+})\Omega_{22}b_1b_2 +$$

$$\delta_{1-}^2(\delta_{2+}^2 + \delta_{2-}^2)b_1^2 - \Delta_{12}^2 \sum_{k=1}^{N} \Omega_{kk} = 0$$

By using a quadratic formula, a solution of the above Equation 59 becomes as in the following Equation 61.

$$b_2 = b_1 \frac{\delta_{1-}(\delta_{1-}\delta_{2-} + \delta_{1+}\delta_{2+})}{(\delta_{1+}^2 + \delta_{1-}^2)\Omega_{22}} \left\{ 1 \pm \left| \frac{\Delta_{12}}{\delta_{1+}\delta_{2+} + \delta_{1-}\delta_{2-}} \right| \right. \qquad \text{(Equation 61)}$$

$$\left. \sqrt{\frac{(\delta_{1+}^2 + \delta_{1-}^2)}{\delta_{1-}^2 b_1^2}\left(\delta_{1-} + \sum_{k=2}^{N}\Omega_{kk}\right) - 1} \right\}$$

Reflecting $\Omega_{11} = \eta_{1,r}\beta_{1-} + \eta_{1,i}\delta_{1+} = \delta_{1-}$ in the above Equation 61, it is as in the following Equation 62.

$$b_2 = b_1 \frac{\delta_{1-}(\delta_{1-}\delta_{2-} + \delta_{1+}\delta_{2+})}{(\delta_{1+}^2 + \delta_{1-}^2)\Omega_{22}} \qquad \text{(Equation 62)}$$

$$\left\{ 1 \pm \left| \frac{\Delta_{12}}{\delta_{1+}\delta_{2+} + \delta_{1-}\delta_{2-}} \right| \sqrt{\frac{(\delta_{1+}^2 + \delta_{1-}^2)}{\delta_{1-}^2 b_1^2}\sum_{k=1}^{N}\Omega_{kk} - 1} \right\}$$

Therefore, when $b_1$ is defined, $b_2$ is determined based on the above Equation 62 and the parameter values from $b_3$ to $b_N$ may be determined by the above Equation 54. Further, $a_1$ may be determined based on the above Equation 53 and the $a_n$ value may be determined based on the above Equation 55.

Meanwhile, instead of determining the parameter $b_1$ value, the phase value $\theta$ to be fixed may be introduced to be used as a selective parameter. When the processes of the above Equations 34 to 36 are applied to $b_2$ of the above Equation 62 as they are, $b_1$ may be expressed by the following Equation 63 as the phase fixing value $\theta$.

$$b_1^2 = \frac{(\delta_{1+} + \delta_{1-}\tan\theta)^2}{\delta_{1-}^2(1 + \tan^2\theta)}\sum_{k=1}^{N}\Omega_{kk} \Rightarrow b_1 = \qquad \text{(Equation 63)}$$

$$\pm \frac{\delta_{1+} + \delta_{1-}\tan\theta}{\delta_{1-}\sqrt{1 + \tan^2\theta}}\sqrt{\sum_{k=1}^{N}\Omega_{kk}}$$

Further, $b_2$ may be expressed by the following Equation 64 as the phase fixing value $\theta$.

$$b_2 = \frac{\delta_{1-}(\delta_{2+} + \delta_{2-}\tan\theta)}{\Omega_{22}(\delta_{1+} + \delta_{1-}\tan\theta)}b_1 = \pm \frac{\delta_{2+} + \delta_{2-}\tan\theta}{\Omega_{22}\sqrt{1 + \tan^2\theta}}\sqrt{\sum_{k=1}^{N}\Omega_{kk}} \qquad \text{(Equation 64)}$$

Substituting the above Equations 63 and 64 expressed by the fixed phase value into the above Equations 54 and 55 and arranging them based on a relational equation of $\Delta_{12} = \delta_{1+}\delta_{2-} - \delta_{1-}\delta_{2+}$, $b_n$ and $a_n$ may be derived based on the following Equations 65 and 66.

$$b_n = \pm \frac{\delta_{n+} + \delta_{n-}\tan\theta}{\Omega_{nn}\sqrt{1 + \tan^2\theta}}\sqrt{\sum_{k=1}^{N}\Omega_{kk}}, \quad n = 1, \ldots, N \qquad \text{(Equation 65)}$$

$$a_n = \mp \frac{\eta_{n,r} - \eta_{n,i}\tan\theta}{\Omega_{nn}\sqrt{1 + \tan^2\theta}}\sqrt{\sum_{k=1}^{N}\Omega_{kk}}, \quad n = 1, \ldots, N \qquad \text{(Equation 66)}$$

Referring to the above Equations 65 and 66, the parameter values may have two values having different signs. The reason is that a value of a trigonometric function for one fixed phase value is two between $[0, 2\pi]$. As a result, there is a need to select one of the two values. When the number of antennas is two, a method for determining one sign among the two values will be described below.

In the above Equations 46 and 49, $b_1$ and $a_1$ may be arranged as in the following Equations 67 and 68.

$$b_1 = \pm \frac{\delta_{1+} + \delta_{1-}\tan\theta}{\delta_{1-}\sqrt{1 + \tan^2\theta}}\sqrt{\delta_{1-} + \Omega_{22}} \,; \tan\theta = \sin\theta/\cos\theta \qquad \text{(Equation 67)}$$

$$= \pm \frac{\delta_{1+}\cos\theta + \delta_{1-}\sin\theta}{\delta_{1-}} \frac{\sqrt{\delta_{1-} + \Omega_{22}}}{\text{sgn}(\cos\theta)}$$

$$a_1 = \mp \frac{1}{\delta_{1-}\sqrt{1 + \tan^2\theta}}\sqrt{\delta_{1-} + \Omega_{22}} \qquad \text{(Equation 68)}$$

$$= \mp \frac{\cos\theta}{\delta_{1-}} \frac{\sqrt{\delta_{1-} + \Omega_{22}}}{\text{sgn}(\cos\theta)}$$

Further, by the above Equation 34, cos and sine values for the selected phase $\theta$ are defined as in the following Equation 69.

$$\cos\theta = \frac{\delta_{1-}a_1}{\sqrt{(\delta_{1-}a_1)^2 + (\delta_{1+}a_1 + b_1)^2}}, \quad \text{(Equation 69)}$$

$$\sin\theta = \frac{-(\delta_{1+}a_1 + b_1)}{\sqrt{(\delta_{1-}a_1)^2 + (\delta_{1+}a_1 + b_1)^2}}$$

Substituting the above Equations 67 and 68 into the above Equation 69 and arranging it, a relational equation as the following Equation 70 is induced.

$$\cos\theta = \mp \frac{\cos\theta}{\text{sgn}(\cos\theta)}, \quad \sin\theta = \mp \frac{\sin\theta}{\text{sgn}(\cos\theta)} \quad \text{(Equation 70)}$$

To establish the two equations expressed by the above Equation 70, when a sign of $\cos\theta$ is (−) (i.e., sgn ($\cos\theta$)=−1), a (−) sign value is selected, and when the sign of $\cos\theta$ is (+) (i.e., sgn($\cos\theta$)=+1), a (+) sign value is selected.

Therefore, when a phase in which the sign of $\cos\theta$ is (+) is selected, a sign of the above Equation 70 is selected as (+) and the signs of the above Equations 67 and 68 are each determined as (−) and (+). Therefore, parameters may be determined to have one sign value as in the following Equation 71.

$$b_1 = -\frac{\delta_{1+}\cos\theta + \delta_{1-}\sin\theta}{\delta_{1-}}\sqrt{\delta_{1-} + \Omega_{22}}, \quad \text{(Equation 71)}$$

$$b_2 = -\frac{\delta_{2+}\cos\theta + \delta_{2-}\sin\theta}{\Omega_{22}}\sqrt{\delta_{1-} + \Omega_{22}}$$

$$a_1 = \frac{\cos\theta}{\delta_{1-}}\sqrt{\delta_{1-} + \Omega_{22}},$$

$$a_2 = \frac{\eta_r\cos\theta - \eta_1\sin\theta}{\Omega_{22}}\sqrt{\delta_{1-} + \Omega_{22}}$$

$$c_2 = \frac{\eta_r - \eta_i\tan\theta}{\Omega_{22}}s - \frac{\eta_i\cos\theta + \eta_r\sin\theta}{\sqrt{\delta_{1-} + \Omega_{22}}}$$

$$c_1 = -\frac{1}{\delta_{1-}}s - \frac{\sin\theta}{\sqrt{\delta_{1-} + \Omega_{22}}}$$

The relationship equation of the above Equation 69 is established even in the case of N antennas. Therefore, when the $a_1$ and $b_1$ values are derived from the above Equations 65 and 66 in the case of N antennas, they may be developed as the above Equation 58.

When as the fixed phase value (0, π) is selected, a second sign value is selected as in the above Equations 65 and 66. As a result, a relationship equation of the following Equations 72 and 73 is established.

$$a_n = \frac{\eta_{n,r}\cos\theta - \eta_{n,i}\sin\theta}{\Omega_{nn}}\sqrt{\sum_{k=1}^{N}\Omega_{kk}}, \quad n = 1, \ldots, N \quad \text{(Equation 72)}$$

$$c_n = -\left[\eta_{n,i}\frac{\sqrt{1+\tan^2\theta}}{\sqrt{\sum_{k=1}^{N}\Omega_{kk}}} + s_n\frac{(\eta_{n,r} - \eta_{n,i}\tan\theta)\tan\theta}{\Omega_{nn}}\frac{\sqrt{\sum_{k=1}^{N}\Omega_{kk}}}{\sqrt{1+\tan^2\theta}}\right], \quad \text{(Equation 73)}$$

$n = 1, \ldots, N$

Here, by substituting the above Equations 72 and 73 into a second equation of the above Equation 57, $c_n$ may be induced as follows.

$$c_n = -\left[\eta_{n,i}\frac{\sqrt{1+\tan^2\theta}}{\sqrt{\sum_{k=1}^{N}\Omega_{kk}}} + s_n\frac{(\eta_{n,r} - \eta_{n,i}\tan\theta)\tan\theta}{\Omega_{nn}}\frac{\sqrt{\sum_{k=1}^{N}\Omega_{kk}}}{\sqrt{1+\tan^2\theta}}\right], \quad \text{(Equation 74)}$$

$n = 1, \ldots, N$

In the above Equation 74, $S_n$ satisfies a relationship equation as the following Equation 75.

$$\sum_{n=1}^{N}s_n = 1. \quad \text{(Equation 75)}$$

Meanwhile, an induction process of $c_k$ is as in the following Equation 76.

$$\delta_{1+}\frac{\eta_{1,r} - \eta_{1,i}\tan\theta}{\Omega_{11}\sqrt{1+\tan^2\theta}}\sqrt{\sum_{m=1}^{N}\Omega_{mm}} - \frac{\delta_{1+} + \delta_{1-}\tan\theta}{\Omega_{11}\sqrt{1+\tan^2\theta}}\sqrt{\sum_{m=1}^{N}\Omega_{mm}} = \quad \text{(Equation 76)}$$

$$\sum_{k=1}^{N}\left(\eta_{k,i}\frac{1}{\frac{\eta_{k,r} - \eta_{k,i}\tan\theta}{\Omega_{kk}\sqrt{1+\tan^2\theta}}\sqrt{\sum_{m=1}^{N}\Omega_{mm}}}\right) +$$

$$\sum_{k=1}^{N}\left(\delta_{k-} - \eta_{k,i}\frac{-\frac{\delta_{k+} + \delta_{k-}\tan\theta}{\Omega_{kk}\sqrt{1+\tan^2\theta}}\sqrt{\sum_{m=1}^{N}\Omega_{mm}}}{-\frac{\eta_{k,r} - \eta_{k,i}\tan\theta}{\Omega_{kk}\sqrt{1+\tan^2\theta}}\sqrt{\sum_{m=1}^{N}\Omega_{mm}}}\right)c_k$$

$$\sum_{k=1}^{N}\left[\left(\delta_{k-} + \eta_{k,i}\frac{\delta_{k+} + \delta_{k-}\tan\theta}{\eta_{k,r} - \eta_{k,i}\tan\theta}\right)c_k + \frac{\eta_{k,i}\Omega_{kk}\sqrt{1+\tan^2\theta}}{(\eta_{k,r} - \eta_{k,i}\tan\theta)\sqrt{\sum_{m=1}^{N}\Omega_{mm}}}\right] =$$

$$-\frac{\delta_{1-}\tan\theta}{\Omega_{11}\sqrt{1+\tan^2\theta}}\sqrt{\sum_{m=1}^{N}\Omega_{mm}}$$

$$\sum_{k=1}^{N}\frac{\Omega_{kk}\sqrt{1+\tan^2\theta}}{-(\eta_{k,r} - \eta_{k,i}\tan\theta)\tan\theta\sqrt{\sum_{m=1}^{N}\Omega_{mm}}}\left(c_k + \frac{\eta_{k,i}\sqrt{1+\tan^2\theta}}{\sqrt{\sum_{m=1}^{N}\Omega_{mm}}}\right) = 1$$

$\Delta_{1n} = \delta_{1+}\delta_{n-} - \delta_{1-}\delta_{n+}, \quad \Omega_{n1} = \eta_{n,r}\delta_{1-} + \eta_{n,i}\delta_{1+}, \quad \Omega_{nn} = \eta_{n,r}\delta_{n-} + \eta_{n,i}\delta_{n+}$ $$c_k = -\left[\eta_{k,i}\frac{\sqrt{1+\tan^2\theta}}{\sqrt{\sum_{m=1}^{N}\Omega_{mm}}} + s_k\frac{(\eta_{k,r} - \eta_{k,i}\tan\theta)\tan\theta}{\Omega_{kk}}\frac{\sqrt{\sum_{m=1}^{N}\Omega_{mm}}}{\sqrt{1+\tan^2\theta}}\right]$$

As described above, the beamspace mapping unit 211 derives the basis beams through a Gram-Schmidt process from the antenna geometry (the number, the disposition interval, and the structure of antenna elements). In this case, the basis beams have orthogonality with each other. However, the basis beams derived as described above do not reflect a radio channel state, and the orthogonality between the signals transmitted to the radio channel through the actual basis beams may be collapsed.

To solve the above problems, a method for maintaining the orthogonality between the signals spatially multiplexed onto the radio channel is required. There are three methods which may be used in the exemplary embodiment of the present invention. The first method is a method for applying precoding to the baseband unit 100, the second method is a method for selecting a set of the basis beams maintaining the orthogonal relationship in channel adaptation in the beamspace MIMO transmission apparatus 200, and the third method is a method for coupling the first method with the second method. To apply the three methods, there is a need to recognize the channel state. A transmitter (for example, corresponding to the load modulation-based beamspace MIMO base station 100 of FIG. 1) may estimate the channel state from a pilot signal transmitted by a receiver (for example, a terminal). Further, the receiver estimates the channel state based on the pilot signal transmitted from the transmitter, and the transmitter may be fed-back with the channel state estimated by the receiver. By the first method, the transmitter may adjust a precoding vector using the estimated channel state. By the second method, the transmitter may adjust a basis beam vector using the estimated channel state. Further, by the third method, the transmitter may use the estimated channel state to simultaneously adjust the precoding vector and the basis beam vector.

Meanwhile, the beamspace MIMO transmission apparatus 200 according to the exemplary embodiment of the present invention as described above facilitates the extension of the massive MIMO. Hereinafter, this will be described.

Recently, research on the massive MIMO for increasing the capacity of the radio channel to accommodate the suddenly increasing mobile data has been in progress. In the case of the existing general MIMO, due to the hardware costs caused by the request of the RF chains for each antenna element and the size problem caused by the spaced distance for avoiding the coupling for each antenna element, the researches are inappropriate for the massive MIMO. In particular, when the transmission method is the OFDM, a peak to average power ratio (PAPR) problem is becoming more and more serious.

As described above, the beamspace MIMO transmission apparatus 200 according to the exemplary embodiment of the present invention has the single RF chain which includes one power amplifier 223 and one oscillator 221. Further, the beamspace MIMO transmission apparatus 200 according to the exemplary embodiment of the present invention may obtain N spatial multiplexing gains through N antennas. As described above, N may be extended to infinity, and even in the case of N antennas, a maximum of N loaded impedance values may be calculated. Therefore, when the beamspace MIMO transmission apparatus 200 according to the exemplary embodiment of the present invention is applied to the massive MIMO, it is possible to efficiency implement costs, size, and power.

Figure 8:
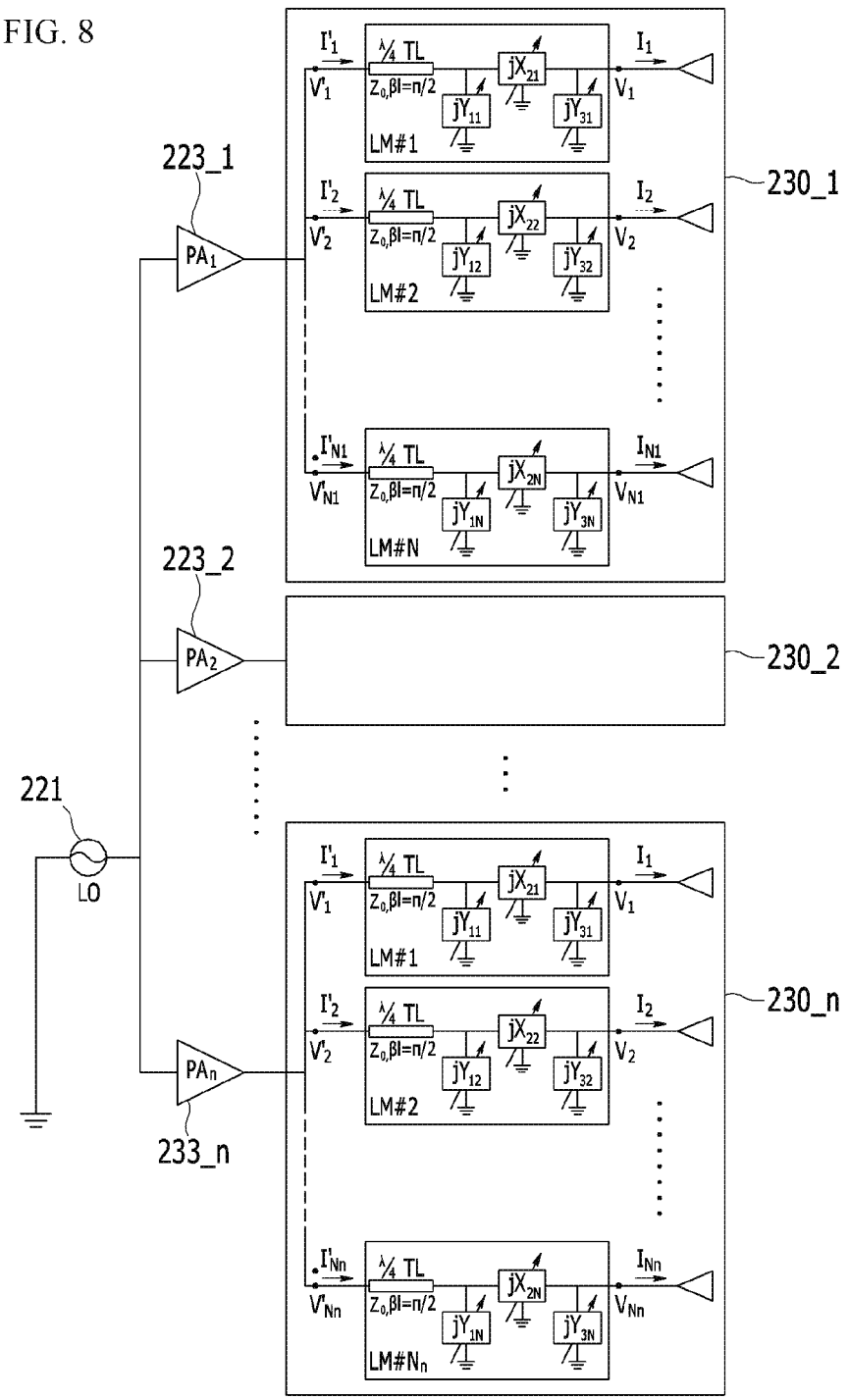
FIG. 8 is a diagram illustrating a case in which the beamspace MIMO transmission apparatus according to the exemplary embodiment of the present invention is applied to the massive MIMO.

FIG. 8 is a diagram illustrating a case in which the beamspace MIMO transmission apparatus according to the exemplary embodiment of the present invention is applied to the massive MIMO. FIG. 8 illustrates only the RF chain and the load modulation unit for convenience.

As illustrated in FIG. 8, the massive MIMO may be implemented by a plurality of load modulation units 230_1 to 230_n and a plurality of power amplifiers 223_1 to 223_n. The massive MIMO is implemented in a module form by using the plurality of load modulation units 230_1 to 230_n and the plurality of power amplifiers 223_1 to 223_n, thereby reducing the calculation load of the loaded impedance values. Further, unlike FIG. 8, to implement the massive MIMO, instead of the plurality of power amplifiers 223_1 to 223_n having a small output, one high output power amplifier may also be used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A beamspace multi-input multi-output (MIMO) transmission apparatus, comprising:
   a plurality of impedance loading circuits including a plurality of imaginary impedance devices each connected to a plurality of antenna elements;
   a beamspace MIMO control unit calculating loading values of the plurality of imaginary impedance devices based on current vectors introduced to the plurality of antenna elements, corresponding to a spatial multiplexing orthogonal frequency division multiplexing (OFDM) sample for beamspace multi-input multi-output (MIMO) and setting the calculated loading values in the plurality of impedance devices; and
   an RF chain unit generating a first signal having a predetermined carrier frequency and transmitting the generated first signal to the plurality of impedance loading circuits,
   wherein the beamspace MIMO control unit includes a delay unit delaying the spatial multiplexing OFDM sample by a predetermined time, and
   the predetermined time is synchronized with a transmission time of the first signal.

2. The beamspace MIMO transmission apparatus of claim 1, wherein
   the plurality of impedance loading circuits are each configured of only the plurality of imaginary impedance devices other than resistance components.

3. The beamspace MIMO transmission apparatus of claim 1, wherein
   the first signal has a sine wave having a fixed size and phase which are not fluctuated in the spatial multiplexing OFDM sample.

4. The beamspace MIMO transmission apparatus of claim 1, wherein
   the beamspace MIMO control unit includes:
   a beamspace mapping unit calculating current vectors introduced into each of the plurality of antenna elements by considering information on the spatial multiplexing OFDM sample, information on basis beams orthogonal to each other, and information on geometry of the plurality of antenna elements; and
   a load modulator control unit using the calculated current vectors to calculate the loading values of the plurality of imaginary impedance devices.

5. The beamspace MIMO transmission apparatus of claim 4, wherein
the beamspace mapping unit further includes the delay unit, and
the predetermined time is set by considering time for the beamspace mapping unit to calculate the current time for the load modulator control unit to calculate the loading values, and time for the plurality of impedance loading circuits to output the loading values.

6. The beamspace MIMO transmission apparatus of claim 5, further comprising a plurality of switches each connected between the RF chain unit and the plurality of impedance loading circuits,
wherein the beamspace mapping unit synchronizes switching of the plurality of switches by considering the predetermined time.

7. The beamspace MIMO transmission apparatus of claim 4, wherein the RF chain unit includes an impedance matching circuit, and
the beamspace mapping unit uses the calculated loading value to set an impedance value of the impedance matching circuit.

8. The beamspace MIMO transmission apparatus of claim 1, wherein the RF chain unit includes:
an oscillator generating the first signal; and
a power amplifier amplifying amplitude of the first signal.

9. The beamspace MIMO transmission apparatus of claim 8, wherein the RF chain unit further includes an attenuator attenuating the amplitude of the first signal, and
wherein a beamspace mapping unit normalizes a magnitude of a beamspace signal vector to which the spatial multiplexing OFDM sample belongs and controls the attenuator based on the normalized magnitude of the beamspace signal vector.

10. The beamspace MIMO transmission apparatus of claim 4, wherein the beamspace mapping unit calculates the current vectors by further considering a channel state.

11. The beamspace MIMO transmission apparatus of claim 1, wherein
the plurality of imaginary impedance devices have a pi-type structure or a T-type structure.

12. A beamspace multi-input multi-output (MIMO) transmission method generating a beamspace signal by modulating loads each connected to a plurality of antenna elements, comprising:
generating a spatial multiplexing OFDM sample for beamspace multi-input multi-output (MIMO) by using a plurality of data streams;
calculating loading values of the plurality of imaginary impedance devices based on current vectors introduced to the plurality of antenna elements, the loading values corresponding to the spatial multiplexing OFDM sample;
setting the calculated loading values in a plurality of imaginary impedance devices connected to the plurality of antenna elements;
generating a first signal having a predetermined carrier frequency and transmitting the generated first signal to the plurality of antenna elements and the plurality of imaginary impedance devices;
delaying the spatial multiplexing OFDM sample by a predetermined time; and
synchronizing the predetermined time with a transmission time of the first signal.

13. The beamspace multi-input multi-output (MIMO) transmission method of claim 12, wherein the load is configured of only the plurality of imaginary impedance devices other than resistance components.

14. The beamspace multi-input multi-output (MIMO) transmission method of claim 12, wherein
the generating includes:
generating a spatial multiplexing signal by performing spatial precoding on the plurality of data streams; and
generating the spatial multiplexing orthogonal frequency division multiplexing (OFDM) sample by performing inverse fast Fourier transform (IFFT) on the spatial multiplexing signal.

15. The beamspace multi-input multi-output (MIMO) transmission method of claim 12, wherein
the first signal has a sine wave having a fixed size and phase which are not fluctuated in the spatial multiplexing OFDM sample.

16. A beamspace MIMO transmission apparatus, comprising:
a first load modulation unit including a first plurality of imaginary impedance devices each connected to a first plurality of antenna elements;
a second load modulation unit including a second plurality of imaginary impedance devices each connected to a second plurality of antenna elements;
a beamspace MIMO control unit calculating loading values of the first and second plurality of imaginary impedance devices based on current vectors introduced to the first and second plurality of antenna elements, the loading values corresponding to a spatial multiplexing orthogonal frequency division multiplexing (OFDM) sample for beamspace multi-input multi-output (MIMO) and setting the calculated loading values in the first and second plurality of impedance devices;
an oscillator generating a first signal having a predetermined carrier frequency;
a first amplifier amplifying the first signal and transmitting the amplified first signal to the first load modulation unit; and
a second amplifier amplifying the first signal and transmitting the amplified first signal to the second load modulation unit,
wherein the beamspace MIMO control unit includes a delay unit delaying the spatial multiplexing OFDM sample by a predetermined time, and
the predetermined time is synchronized with a transmission time of the first signal.

17. The beamspace MIMO transmission apparatus of claim 16, wherein
the first and second load modulation units are each configured of only the first and second plurality of imaginary impedance devices other than resistance components.

18. The beamspace MIMO transmission apparatus of claim 16, wherein
the first signal has a sine wave having a fixed size and phase which are not fluctuated in the spatial multiplexing OFDM sample.

19. The beamspace MIMO transmission apparatus of claim 16, wherein
the beamspace MIMO control unit further includes:
a beamspace mapping unit calculating current vectors introduced into each of the first and second plurality of antenna elements by considering information on the spatial multiplexing OFDM sample, information on basis beams orthogonal to each other, and information on geometry of the first and second plurality of antenna elements; and a load modulator control unit using the calculated current vectors to calculate the loading values of the first and second plurality of imaginary impedance devices.

\* \* \* \* \*